United States Patent [19]

Miyamoto et al.

[11] Patent Number: 4,897,778

[45] Date of Patent: Jan. 30, 1990

[54] MOTOR CONTROL DEVICE

[75] Inventors: Kazuki Miyamoto, Yokohama; Yutaka Komiya, Tokyo; Masato Ishida, Yokohama; Shinichi Nakamura, Tokyo; Masanori Miyata; Masayuki Hirose, both of Yokohama; Masahiro Tomosada; Hideki Adachi, both of Kawasaki, all of Japan

[73] Assignee: Canon Kabushiki Kaisha, Tokyo, Japan

[21] Appl. No.: 172,933

[22] Filed: Mar. 25, 1988

Related U.S. Application Data

[63] Continuation of Ser. No. 635,592, Jul. 30, 1989, abandoned.

[30] Foreign Application Priority Data

Aug. 4, 1983 [JP] Japan ................................ 58-141821
Aug. 4, 1983 [JP] Japan ................................ 58-141822
Aug. 4, 1983 [JP] Japan ................................ 58-141823
Aug. 4, 1983 [JP] Japan ................................ 58-141824
Aug. 4, 1983 [JP] Japan ................................ 58-141825
Aug. 4, 1983 [JP] Japan ................................ 58-141826
Aug. 4, 1983 [JP] Japan ................................ 58-141827
Aug. 4, 1983 [JP] Japan ................................ 58-141828
Aug. 4, 1983 [JP] Japan ................................ 58-141829
Aug. 4, 1983 [JP] Japan ................................ 58-141830
Aug. 4, 1983 [JP] Japan ................................ 58-141831

[51] Int. Cl.⁴ ...................... G06F 15/46; G03G 15/00
[52] U.S. Cl. ...................... 364/174; 318/599; 318/608; 355/233; 364/400; 388/810; 388/811; 388/813; 388/904

[58] Field of Search ............... 364/130, 167, 174, 400; 318/310, 314, 329, 345 E, 601, 603, 605, 607, 608, 599; 355/14 R, 14 C, 8

[56] References Cited

U.S. PATENT DOCUMENTS

| 3,820,893 | 6/1974 | Donohue et al. | 355/14 R |
| 3,906,327 | 9/1975 | O'Callaghan et al. | 318/606 X |
| 3,917,400 | 11/1975 | Rodek et al. | 355/50 |
| 4,287,461 | 9/1981 | Promis et al. | 318/603 X |
| 4,313,074 | 1/1982 | Nomura et al. | 318/608 |
| 4,332,461 | 6/1982 | Cail et al. | 355/14 R |
| 4,346,434 | 8/1982 | Morinaga | 364/174 X |

FOREIGN PATENT DOCUMENTS 1318908 5/1973 United Kingdom .
2031617 4/1980 United Kingdom .
2143059 1/1985 United Kingdom .

Primary Examiner—Joseph Ruggiero
Attorney, Agent, or Firm—Fitzpatrick, Cella, Harper & Scinto

[57] ABSTRACT

There is provided a motor control device comprising a motor; an apparatus for entering the number of revolutions of the motor; a detector that detects the number of revolutions of the motor; and a microcomputer for entering the output from the detector and a controlling the motor according to predetermined programs, wherein the microcomputer comprises a counter to which a count value is set according to a circuit from the input to form a reference frequency signal and a circuit for forming a phase error signal according to the reference frequency signal and the output of the detector and outputs a signal for driving the motor based on the phase error signal.

12 Claims, 27 Drawing Sheets

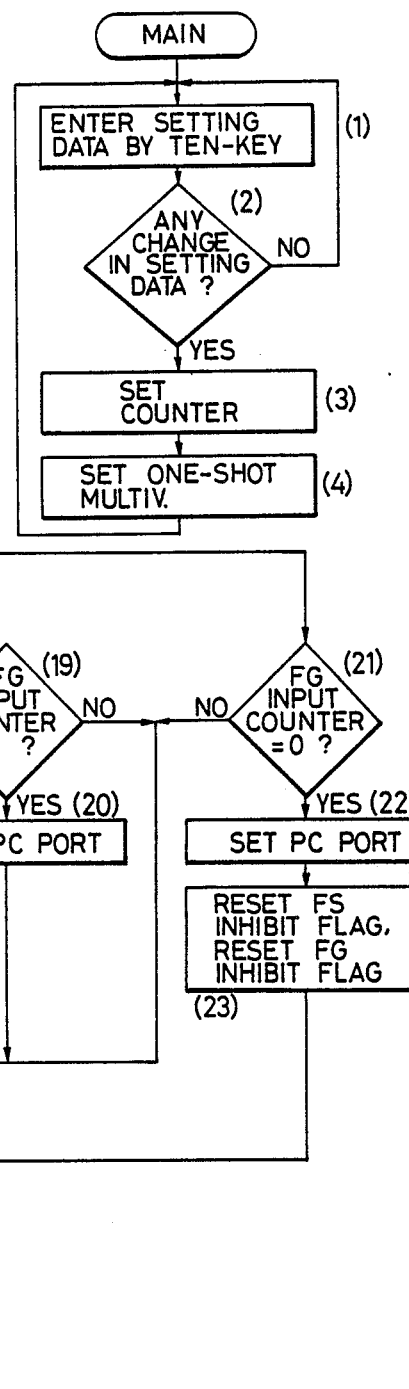
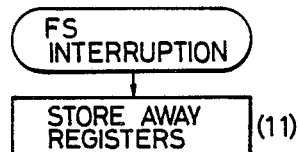

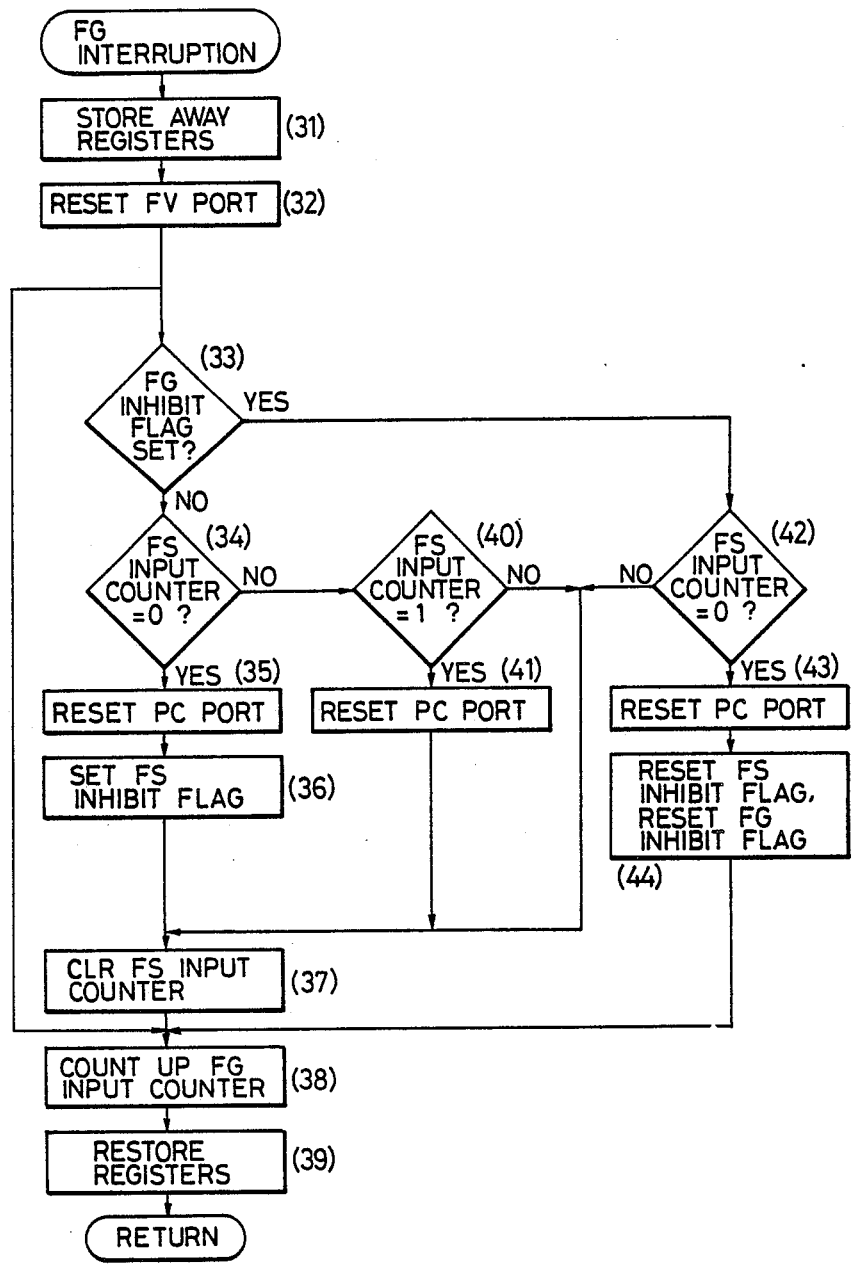

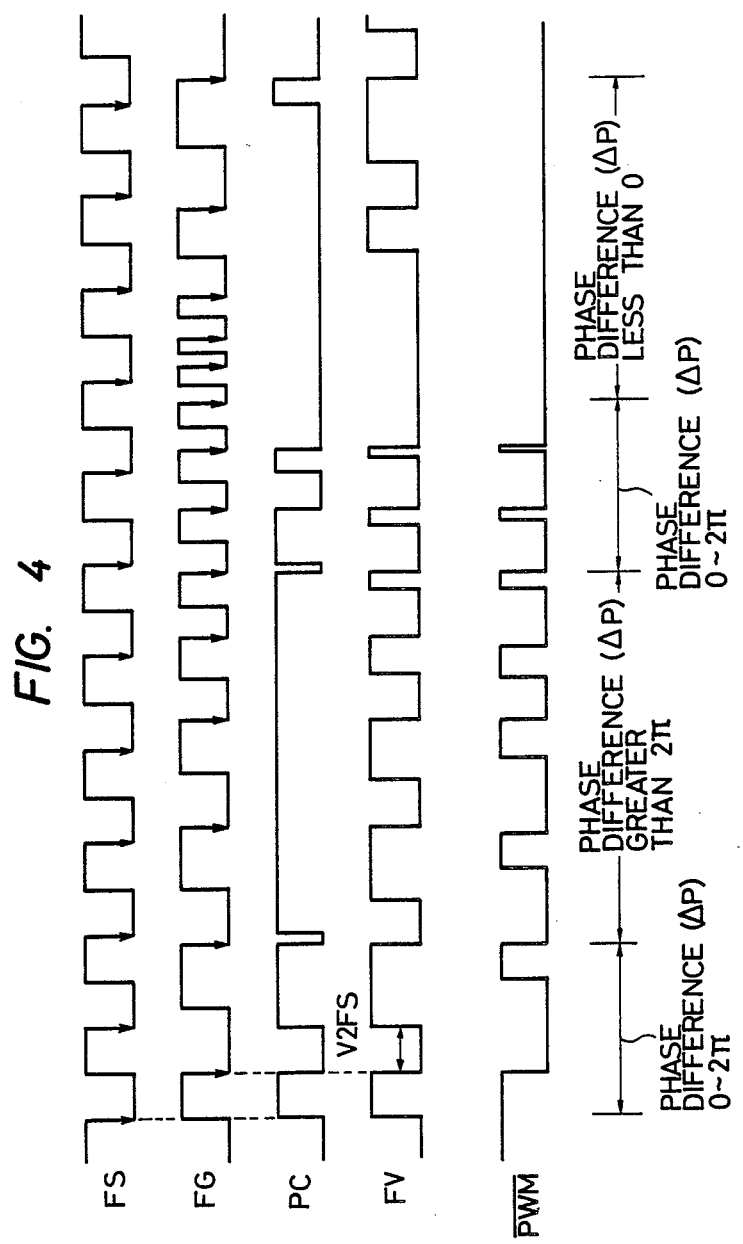

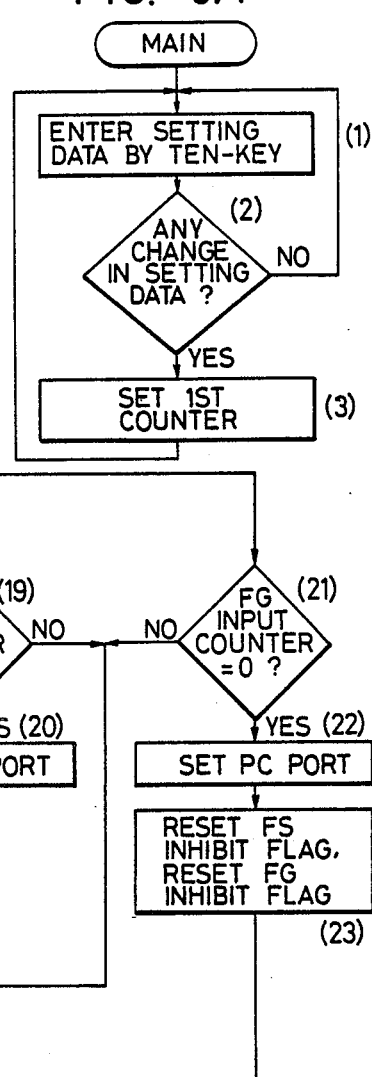

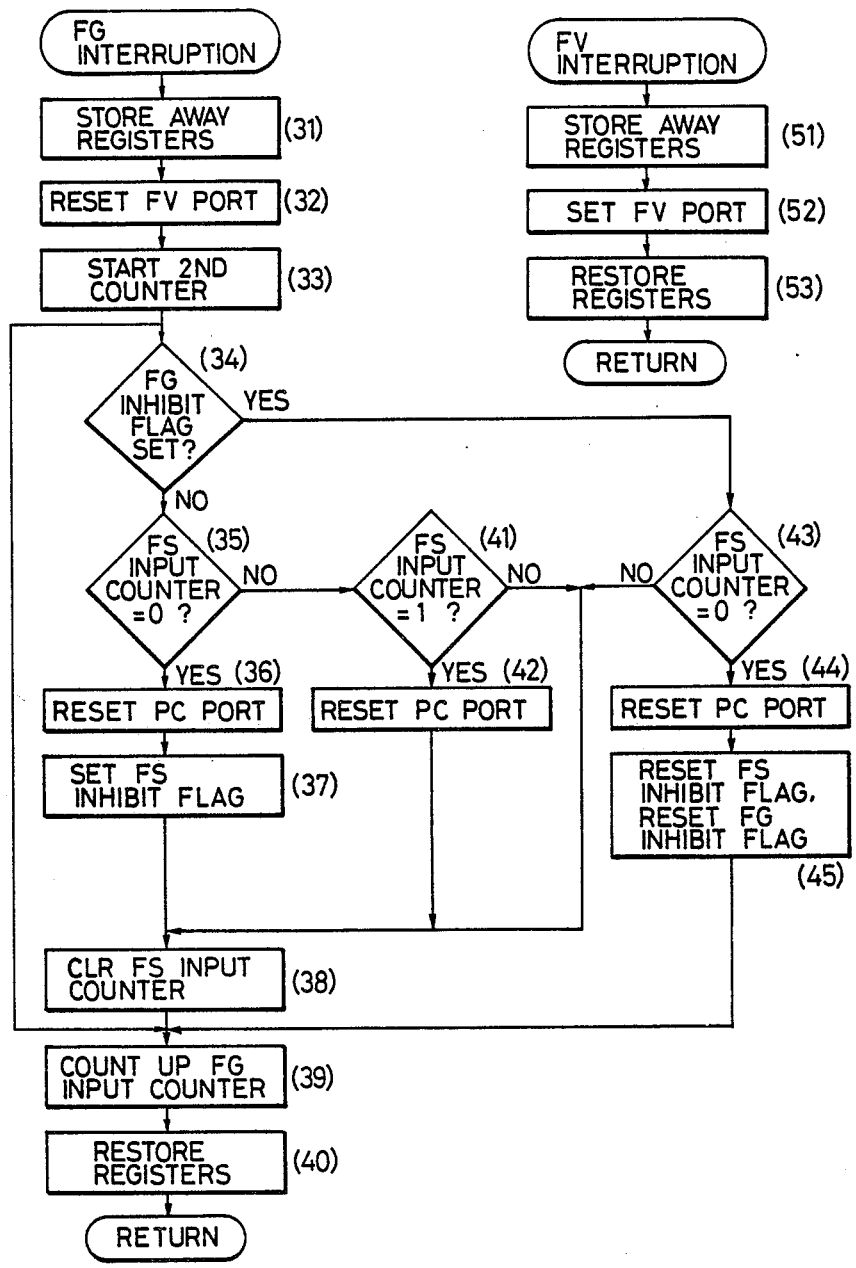

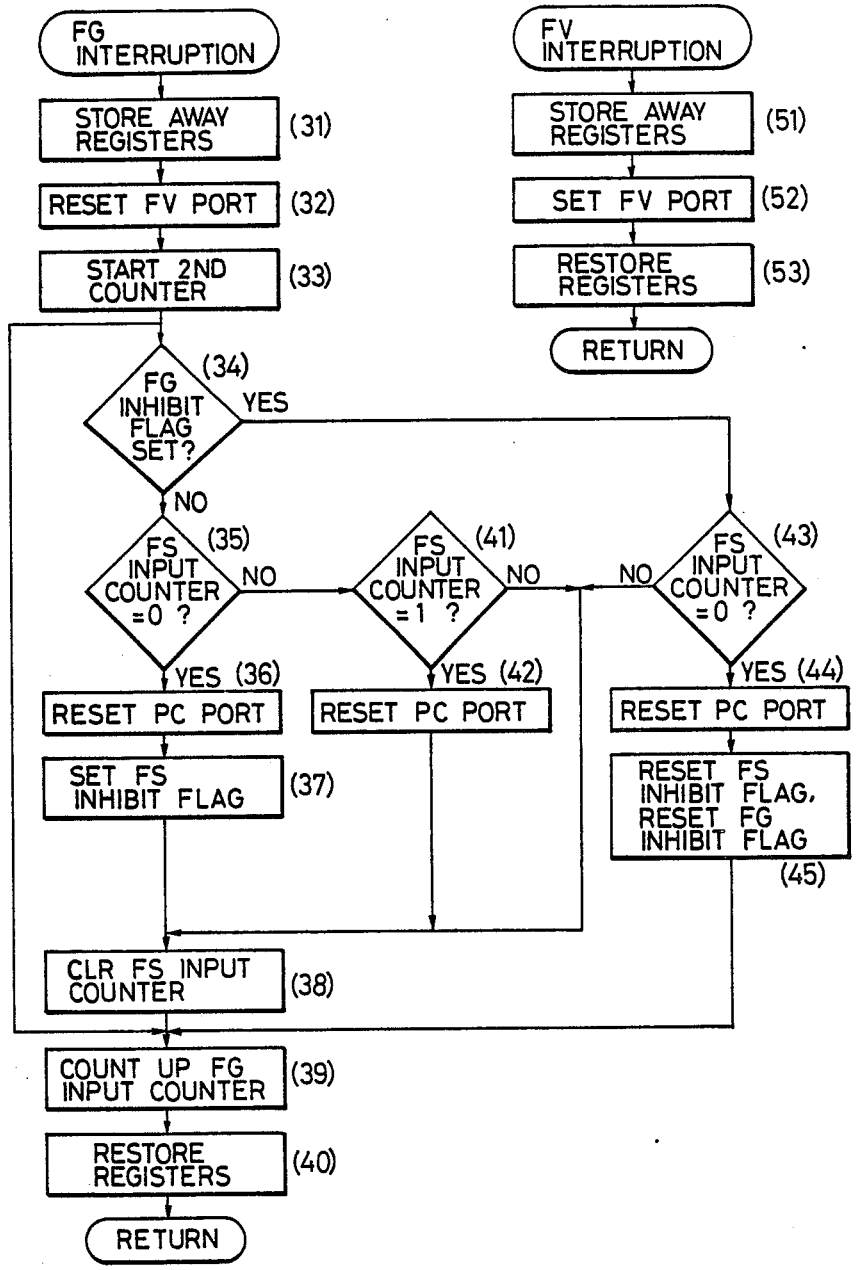

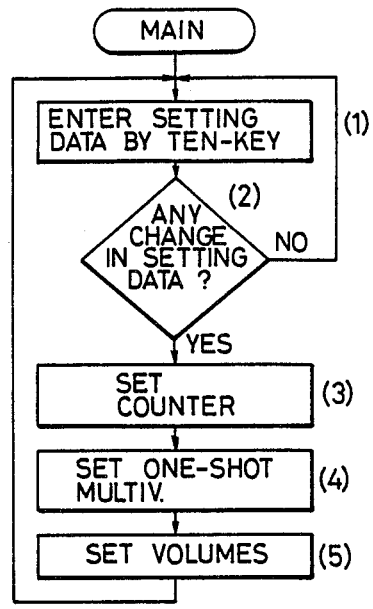
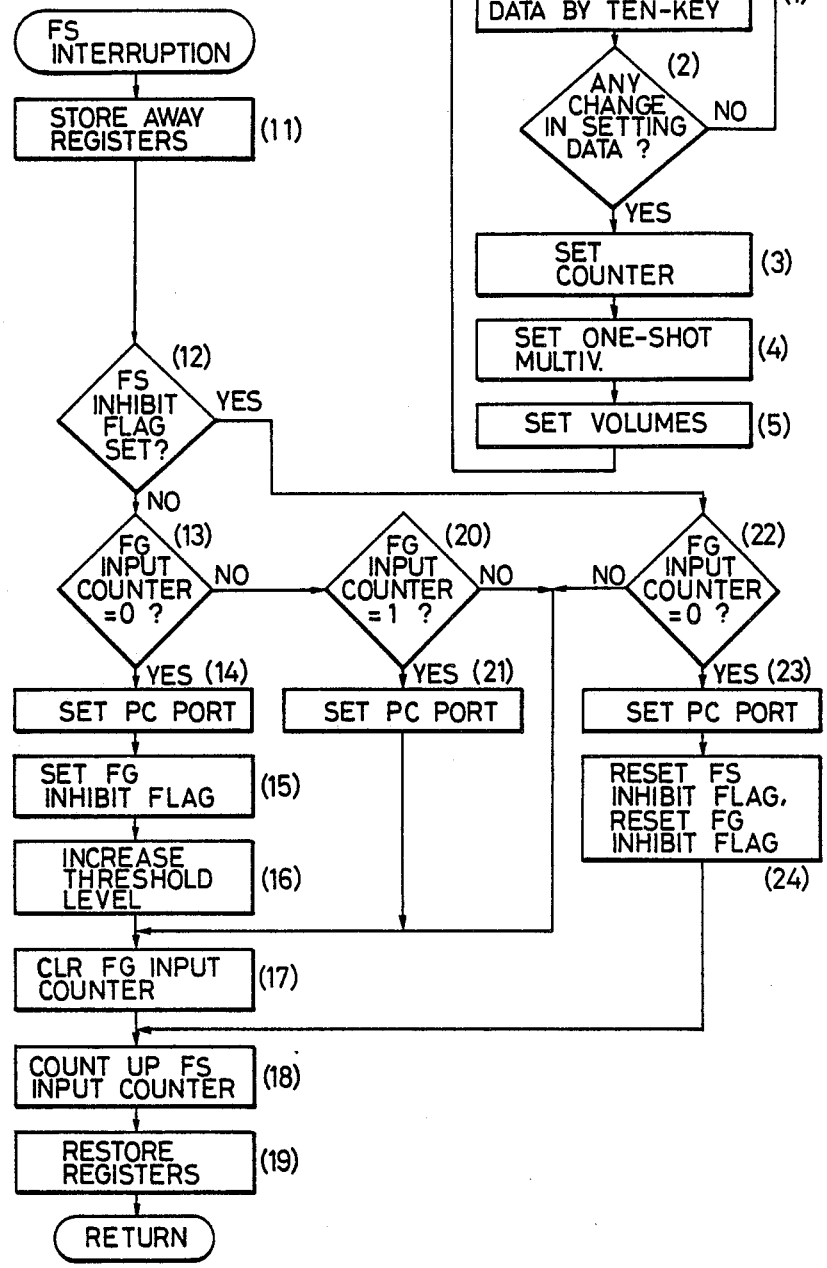

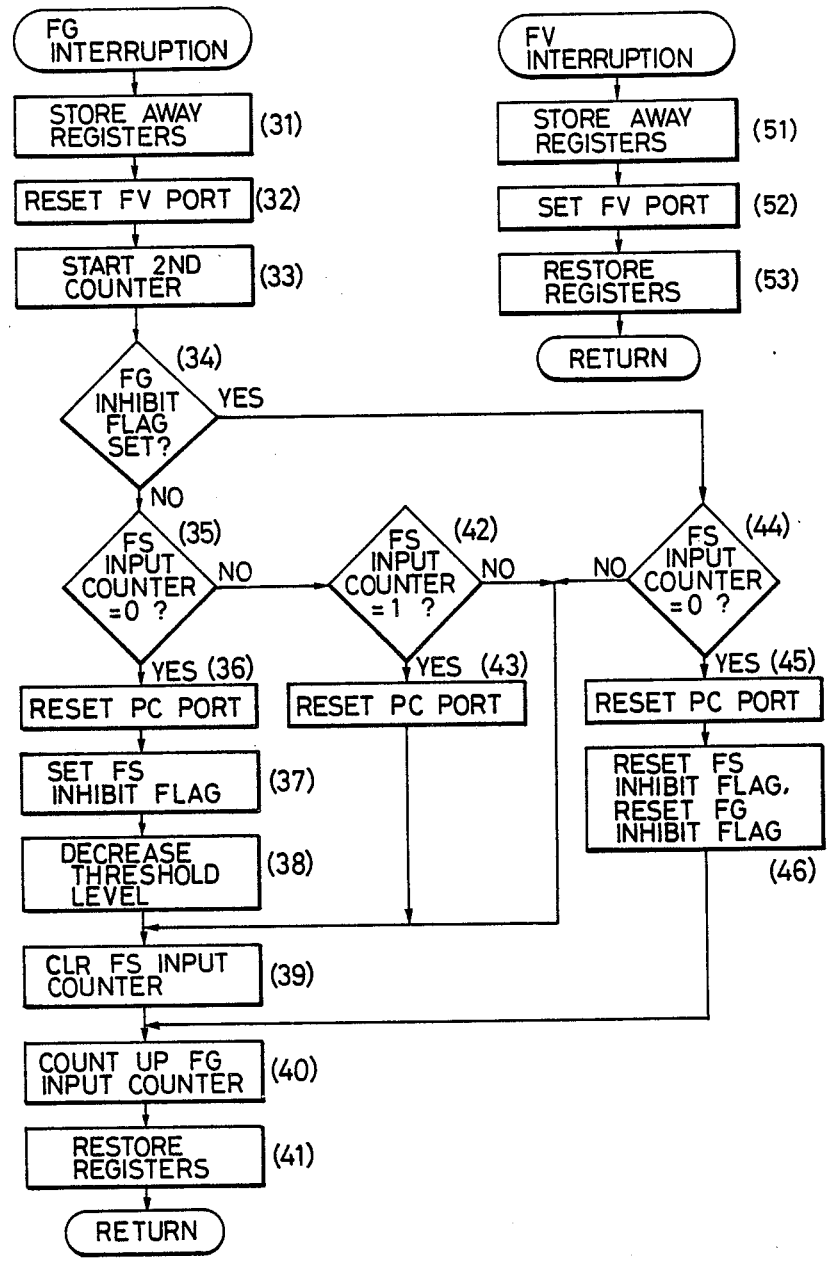

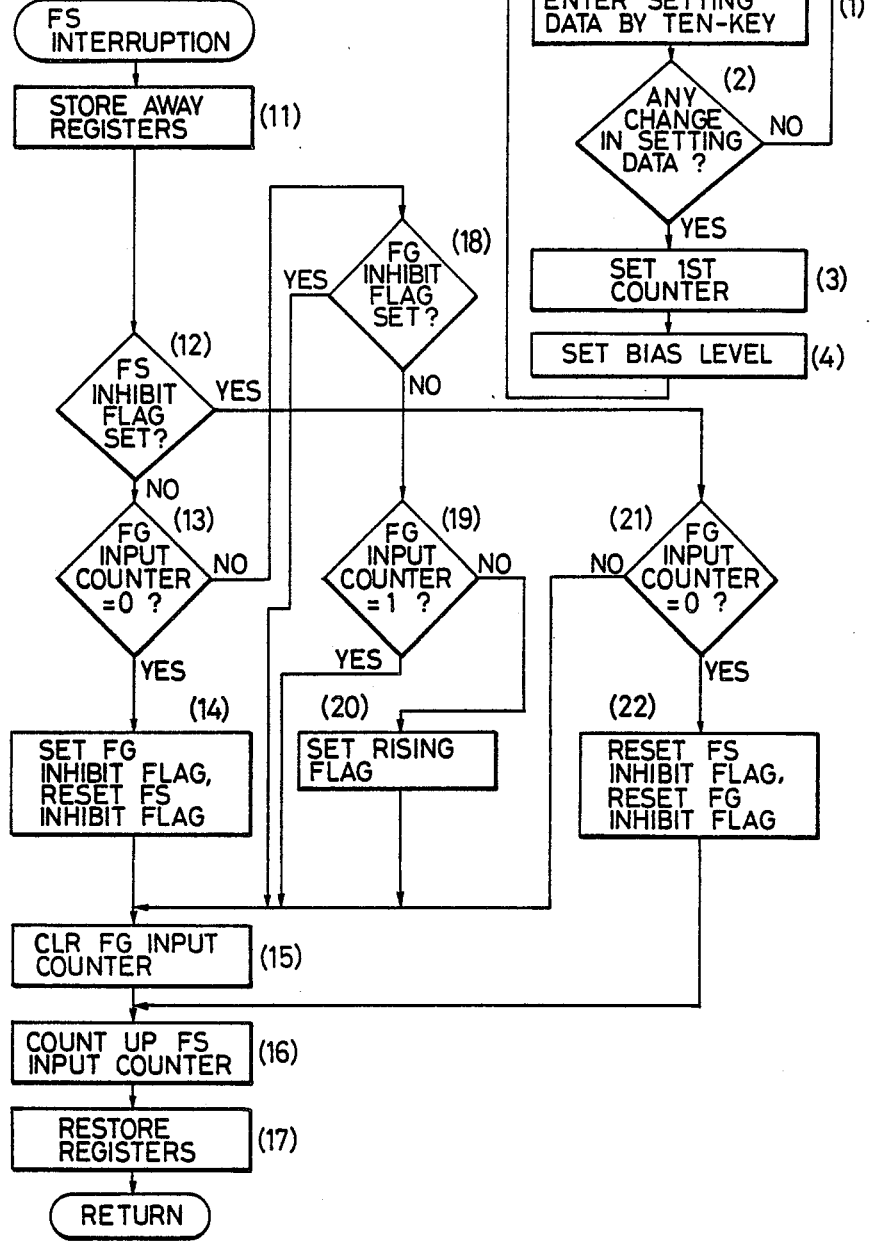

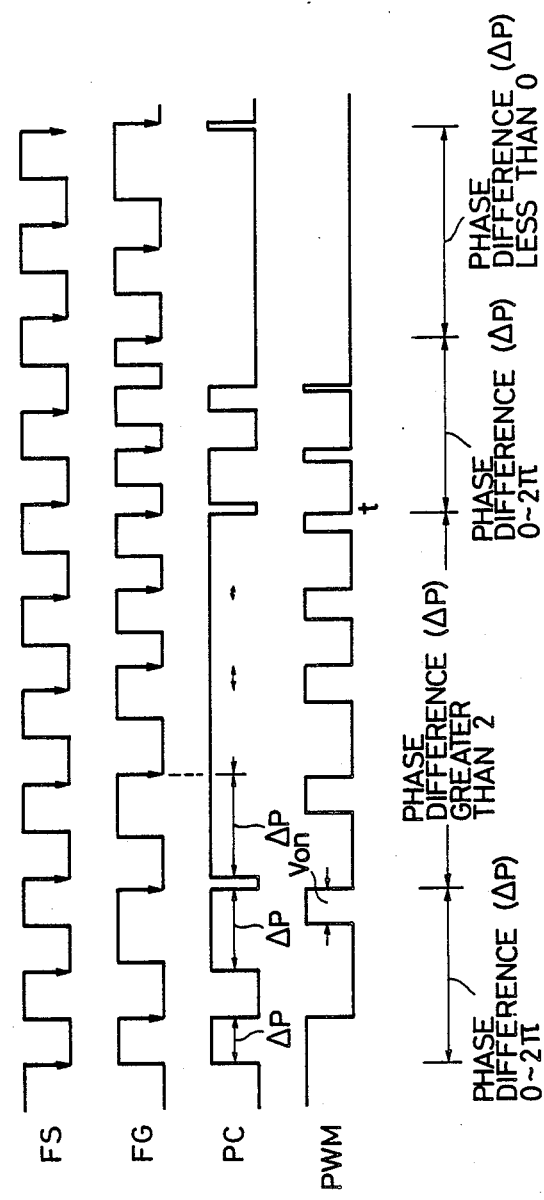

MOTOR CONTROL DEVICE

This application is a continuation of application Ser. No. 635,592 filed 7/30/84 abandoned.

BACKGROUND OF THE INVENTION

1. Field of the Invention

The present invention relates to the field of control devices of motors to be used for copying machines or the like, and typically to motor control devices suitable for use in copying machines for performing continuous size change through continuous control of the speed of the scanning optical system.

2. Description of the Prior Art

In this type of control unit, particularly in the PLL control, the PLL control characteristics have been dependent on the characteristics of the low-pass filter.

In addition, in a control device designed to synchronize with the speeds which are various set points, it has been required that the above low-pass filter should be switched.

In addition, for the PWM (pulse width modulation) of the motor, devices such as an adder for the addition of a PLL signal and a speed control loop signal and an integrator for integrating the adder output have been required.

In addition, since these, in general, devices have been comprised of hardware, the reference frequency and feedback frequency from the encoder of the driving motor have been divided by a divider for continuous speed change or the reference frequency has been switched with th inevitable increase of the device size as a drawback.

SUMMARY OF THE INVENTION

An object of the present invention is to eliminate the aforementioned disadvantages.

A further object of the present invention is to improve the motor control device A further object of the present invention is to provide a small size motor control device.

A further object of the present invention is to provide a motor control device capable of performing wide range PLL speed control.

A further object of the present invention is to provide a small size motor control device featured by high precision and wide range PLL speed control by the use of a microcomputer.

A further object of the present invention is to provide a motor control device featured by high reliability.

A further object of the present invention is to provide a motor control device of simple structure capable of performing PLL speed control over a wide range at a high precision.

The above and further objects of the present invention will be better understood from the following description considered in connection with the accompanying drawings and claims.

BRIEF DESCRIPTION OF THE DRAWINGS

FIG. 3A through FIG. 3C are flow charts for illustrating the operation of FIG. 2;

FIG. 4 is a diagram showing the waveform at each part;

FIG. 8A through FIG. 8D are flow charts for illustrating the operation of FIG. 7;

FIG. 14A through FIG. 14D are flow charts for illustrating the operation of FIG. 13;

FIG. 15A through FIG. 15C are flow charts for illustrating the operation of a seventh embodiment of the present invention;

FIG. 17A through FIG. 17D are flow charts for illustrating a ninth embodiment of the present invention;

FIG. 19A through FIG. 19D are flow charts for illustrating the operation of FIG. 18: and FIG. 20 is a signal waveform diagram for illustrating the operation of FIG. 18.

DETAILED DESCRIPTION OF THE PREFERRED EMBODIMENTS

The embodiments of the present invention will now be described with reference to the accompanying drawings.

Figure 1:
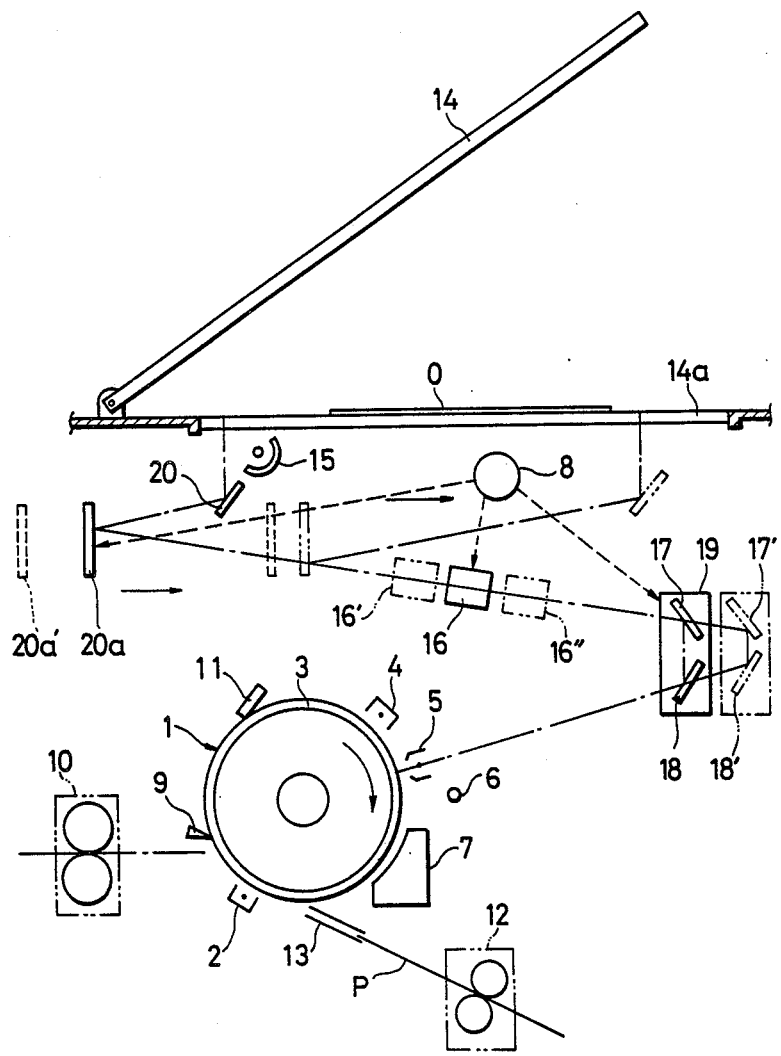
FIG. 1 is a schematic exploded view of a copying equipment to which the present invention is applicable.

FIG. 1 is a schematic view of a copying equipment to which the present invention is applicable.

In FIG. 1, 1 is a photosensitive drum, and is rotated by a motor (not shown) in the arrow direction. The circumferential surface of the photosensitive drum 1 is covered with a photosensitive element 3 comprising a conductive foundation layer, a photoconductive layer, and a transparent surface insulation layer. The speed of the photosensitive drum 1 is constant both in the real size and size change copying modes. The photosensitive drum 1 is first charged uniformly by a DC corona discharger 4, and then charged by the corona discharge of an AC or a DC corona discharger 5 of the polarity opposite to the above charging concurrent with the slit exposure of the image of an original 0 by a later-mentioned optical system. In this discharger 5 is provided a slit opening to allow bundle of rays to pass. Then, the photosensitive drum 1 is illuminated by a lamp 6 uniformly throughout its surface, and a static latent image of a high contrast according to the original image is formed. The static latent image is then converted to a toner image by a developer 7, hence being made visible. Then, the toner image is transferred on a paper P transferred about the circumferential surface of the photosensitive drum 1 by a transfer charger 2. Here, the polarity of the transfer charger 2 is the same as that of the DC discharger 4. After the toner image transfer, the paper P is peeled off from the circumferential surface of the photosensitive drum 1 by a separation claw 9, and guided to a fixing unit 10. There the toner image is fixed to the paper P. On the other hand, after image transfer the residual toner image on the circumferential surface of the photosensitive drum 1 is removed by a cleaner 11 so as to be ready for the next copying operation. A sheet of the paper P of the size as selected according to the scale factor of copying and the area to be copied is transferred from a paper feed cassette for that size (not shown) to the transfer position by a transfer means 12 via a guide 13.

The original 0 is set on a transparent original plate 14a, and is scanned in the arrow direction by optical system comprising (from the under side) a first mirror 20, a second mirror 20a moving at a speed ½ that of the first mirror 20, and an illumination lamp 15. In this case, it is preferable that the illumination lamp 15 is designed to be supported by the same holder together with the first mirror 20. The moving speed of the first mirror 20 is a value obtained by multiplying the circumferential speed of the photosensitive drum 1 by the inverse number of copying scale factor, that is, the image forming scale factor of an image forming lens 16. For changing the scale factor, the optical path length between the lens and the original and that between the lens and the photosensitive element must be changed. However, in the case of the real size copying, the lens 16, the second mirror 20a, a third mirror 17, and a fourth mirror 18 are at positions indicated by continuous leader lines. In the case of m<1, i.e., reduced copying, relative positional relationship between the first mirror 20 and the second mirror 20a which are the components of the scan optical system is changed by shifting the second mirror 20a to the position of 20a', and the image forming lens is shifted to the position of 16". On the other hand, in the case of m>1, i.e., magnification copying, the image forming lens 16 is shifted to the position of 16', and the third mirror 17 and the fourth mirror 18 are shifted to the positions of 17' and 18' respectively. In this manner, by changing each optical path length, magnification and reduction can be made.

The lens 16, the third mirror 17 and the fourth mirror 18 are held in position while the first mirror 20 and the second mirror 20a are making scan shift, and do not move. 8 is a pulse motor for shifting the lens 16 and mirrors 20a, 17, and 18 according to a specified scale factor.

In addition, in this copying equipment, an operation unit (not shown) for specifying a changed scale factor, the number of copy papers, and the like are provided, thus allowing the operator to select a desired scale factor.

In addition, the optical system moves in the arrow direction at a speed corresponding to the specified changed scale factor as the DC motor (not shown) runs.

Figure 2:
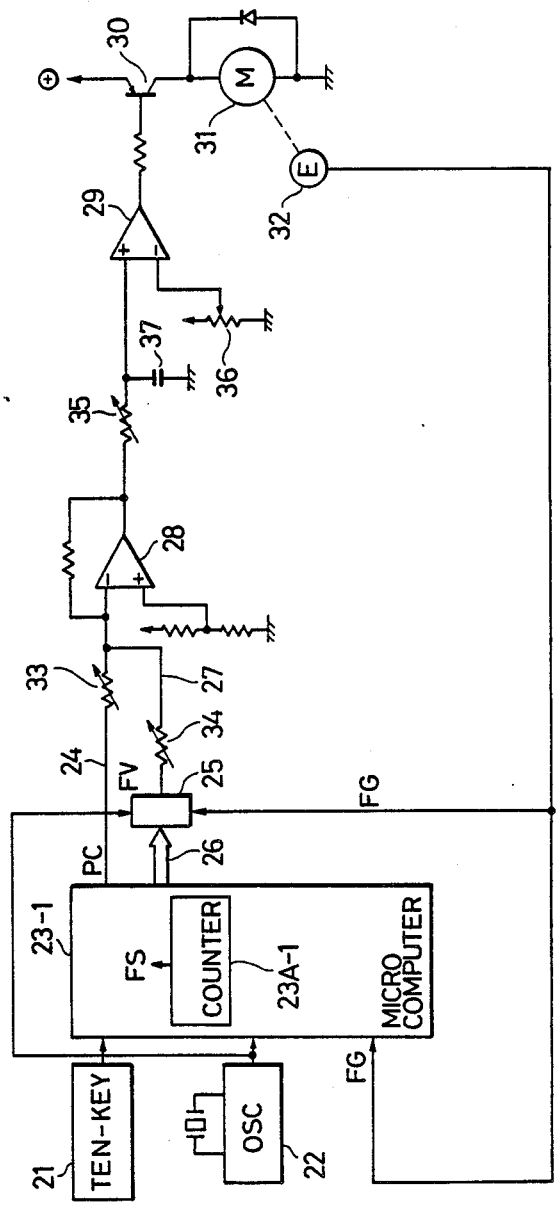
FIG. 2 is a circuit diagram of a first embodiment of the present invention.

FIG. 2 is a circuit diagram of a first embodiment of the present invention. 21 is a ten-key keyboard for the designation of a motor speed (changed scale factor), 22 is an oscillator for driving a counter in the microcomputer, 23-1 is a microcomputer for the speed control. The microcomputer 23-1 has a counter 23A-1. The counter 23A-1 counts clock pulses of the oscillator 22, and generates the reference frequency signal FS for the phase comparison according to the motor speed designation from the ten-key 21. The microcomputer 23-1 also enters a later-mentioned signal FG to an interruption terminal. 24 is an output line, and outputs the phase comparison signal PC generated in the microcomputer 23-1 as described later. 25 is a programmable one-shot multivibrator, is set by a data 26 to be output from the microcomputer 23-1, and counts the output of the oscillator 22, and operates on a feedback signal FG from a later-mentioned encoder taking it as a trigger, generates a speed control signal FV, and outputs it to an output line 27. 28 is an adder for the addition of the phase comparison signal PC to the speed control signal FV, 29 is a comparator for performing pulse width modulation (PWM), 30 is a driver for driving the motor, 31 is a DC motor typically for driving the optical system, 32 is an encoder for detecting the rotation speed of the motor 31. The encoder generates the feedback signal FG, and enters it to the microcomputer 23-1 and the one-shot, multivibrator 25. 33 through 36 are variable resistors, and 37 is a capacitor.

Regarding the continuous size change, it can be realized by continuously changing the scanning speed of the optical system when the drum speed is constant. When the frequency of the feedback signal FG of the encoder 32 of the optical system drive motor 31 is 1 kHz (period T=1 ms) in the real size copy mode, and the scale factor is changed in 1% steps, the period T changes every 0.01 ms. In addition, in this embodiment the reference frequency signal FS can be created by counting the signal of the maximum frequency (100 kHz) at the counter 23A-1. The aforementioned maximum frequency is generated by the oscillator 22.

Operational outline of the embodiment of FIG. 2 will now be described.

The adder 28 makes addition of the phase comparison signal PC output from the microcomputer 23-1 and speed control signal FV. The output thereof is integrated by a filter comprised of the variable resistor 35 and the capacitor 37, and pulse-width-modulated by a threshold value determined by the variable resistor 36 of the comparator 29. The PWM signal from the comparator 29 is fed to the driver 30, drives the motor 31, and controls the motor 31 according to the motor speed command from the ten-key keyboard 21 so that the reference frequency signal FS and the feedback signal FG are kept at a predetermined phase difference.

The procedure for controlling the phase comparison and speed will be described with reference to flow charts of FIG. 3A through FIG. 3C, and a waveform diagram of FIG. 4. In FIG. 3A through FIG. 3C, (1), (2), . . . are step numbers. Flow charts of FIG. 3A through FIG. 3C are stored in a ROM in the microcomputer 23-1 as programs.

The speed (scale factor) of the motor 31 is fed from the ten-key keyboard 21 (1). When the set value is changed (2), a set value (data) is set to the counter 23A-1 (3), and count down is started. Now, an interrupt signal is generated after the completion of count down at the counter 23A-1, the set value is set again automatically, and count down is repeated. As a result, data 26 is set to the one-shot multivibrator 25 (4).

The speed control signal FV is obtained by setting the timer value which is ½FS of the reference frequency signal FS corresponding to the scale factor to the one-shot multivibrator 25 in step (4) of FIG. 3A. That is, in the one-shot multivibrator 25, the output of the one-shot multivibrator is reset and the counter in the one-shot multivibrator 25 starts counting concurrent with the rise of the feedback signal FG of the encoder 12, and the output of the one-shot multivibrator 25 is set after count up. As a result, the speed control signal FV of FIG. 4 is generated.

Regarding the phase comparison signal PC, its set/reset is repeated at the fall of the reference frequency signal FS and feedback signal FG when the phase difference is 0 to $2\pi$. When the phase of the feedback signal FG lags $2\pi$ or more, the phase comparison signal Fc keeps the set condition, and the operation of the aforementioned phase difference 0 to $2\pi$ is repeated after detection of the fall of the feedback signal FG twice during a period of the reference frequency signal FS. Conversely, when the phase of the feedback signal FG advances, that is, when the phase difference becomes below zero (0), the phase comparison signal remains in the reset condition, and repeats the operation in case of the aforementioned phase difference of 0 to $2\pi$ after the detection of the fall of the reference frequency signal FS twice during a period of the feedback signal FG.

The above operation will be further described in connection with FIGS. 3B and 3C.

As shown in FIG. 4, when the phase difference is 0 to $2\pi$, since the condition is always in the FS inhibit flag reset and input counter=1, the PC port of the microcomputer 23-1 is set (20) by the FS interrupt signal through (11),12),(13)and (19), the counter for counting FG interruption frequency is cleared (16), then the counter for counting the FS interruption frequency is caused to count up (17), interruption enable is performed (18) concurrent with the restoration of the register, and the operation is returned.

In addition, since the condition is FG inhibit flag reset and FS input counter=1, the PC port is reset (41) by the FG interrupt signal through (31), (32), (33), (34) and (40), the counter for counting the FS interruption frequency is cleared (37), the counter for counting the FG interruption frequency is caused to count up (38), interruption enable is performed concurrent with the restoration of the register (39), and the operation returns. PC port set and reset are repeated by a series of these steps.

That is, the FS interrupt signal and the FG interrupt signal are generated alternately.

When the phase difference is $2\pi$ or more (FIG. 4), since initial condition is FS inhibit flag reset and FG input counter=1, the PC port is set (20) through (11), (12), (13), and (19) similar to the above, the counter for counting the FG interruption frequency is cleared (16), the counter for counting the FS interruption frequency is caused to count up (17), interruption enable is performed concurrent with the restoration of the register (18). and the operation is returned. Then, since the FG interrupt signal enters again, the PC port is set (14) if the FG input counter=0 (13), the FG inhibit flag is set (15), the counter for counting the FG interruption frequency is cleared (16), the counter for counting the FS interruption frequency is caused to count up (17), interruption enable is performed concurrent with the restoration of the register (18), and the operation returns. Since the condition is FG inhibit flag set and FS input counter≠0, even when the FG interrupt signal enters, a PWM signal causing the phase of the motor 31 to advance is fed to the driver 30 via steps (33), (42), (37), (38) and (39). When the phase of feedback signal FG advances, an FG interrupt signal is entered, and FS interruption frequency=0, the PC port is reset (43) through the judgment in steps (33) and (42), the FS inhibit flag and FG inhibit flag are reset (44), and the operation returns via steps (38) and (39). Thereafter, the operation in the condition of phase difference 0 to $2\pi$ is repeated.

On the other hand, when the phase of feedback signal FG advances, operation similar to when the phase lags is performed except that the relation between FS and FG is interchanged, the driver 30 is driven so as to delay the phase of the motor 31 via steps (35), (36), . . . , (12), (21), (16) and (17), and is controlled so as to bring the phase difference to $0-2\pi$.

Though in the above embodiment, the reference clock of the counter 23A is created by the external oscillator 22, the reference clock FS may be created using an internal clock in the microcomputer 23-1. In addition, though the motor 31 is driven by PWM, motor speed control may be made by changing DC voltage to be applied to the motor 31. These alternatives also apply to other embodiments of the present invention to be described hereinafter.

Figure 5:
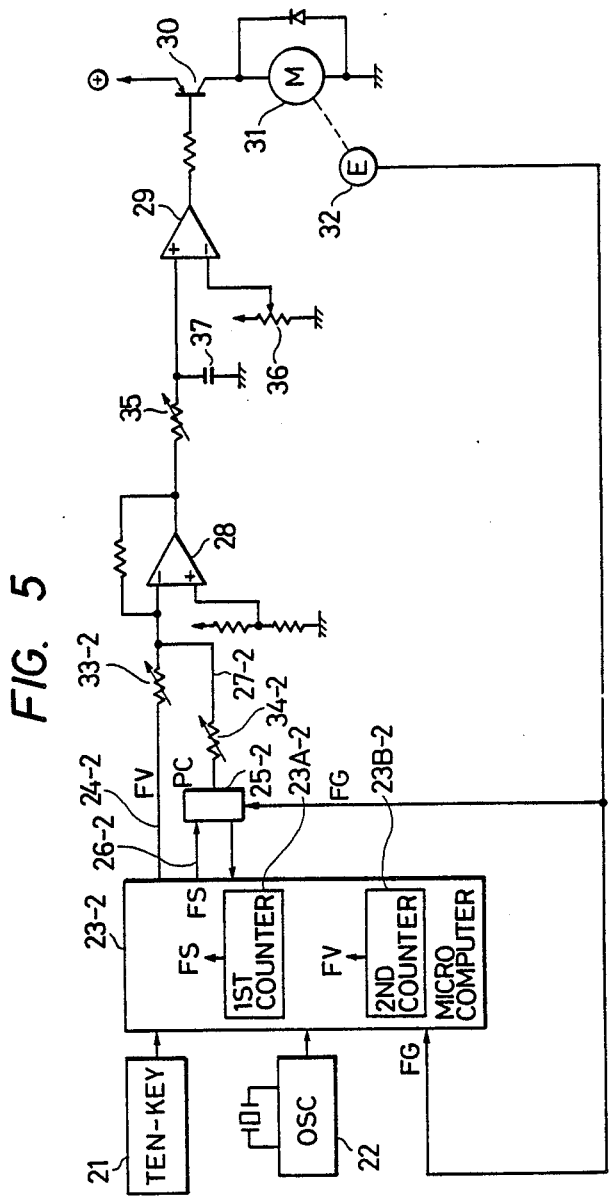
FIG. 5 is a circuit diagram showing a second embodiment of the present invention.

FIG. 5 is a circuit diagram of a second embodiment of the present invention.

In FIG. 5, similar reference characters denote elements having functions similar to the elements of FIG. 2, and the description thereof is omitted.

In FIG. 5, 23-2 is a microcomputer for the speed control, and has a first counter 23A-2 and a second counter 23B-2. The first counter 23A-2 counts the clock of an oscillator 22, and generates a reference frequency signal FS for phase comparison according to the motor speed designation from a ten-key keyboard 21. The second counter 23B-2 generates a speed control signal FV of a fixed width pulse according to the motor speed designation synchronized with the feedback signal FG from an encoder described later. The feedback signal FG is entered to the interrupt terminal of the microcomputer 23-2. 24-2 is an output line, and 25-2 is a phase comparator which creates a phase comparison signal PC from the reference frequency signal FS having output from an output line 26-2 of the microcomputer 23-2 and the feedback signal FG, and outputs to an output line 27-2. 32 is an encoder for detecting the rotation speed of the motor 31, generates the feedback signal FG, and enters that signal to the microcomputer 23-2 and the phase comparator 25-2. 33-2, 34-2, 35, and 36 are variable resistors.

As described in connection with FIG. 2, in the circuit of FIG. 5 also, for repeating a given oscillation at a predetermined period each time the first counter 23A-2 repeats count up, the oscillator 22 is caused to oscillate at 100 kHz, and the reference frequency signal FS is generated by setting a count value corresponding to the scale factor to the first counter 23A-2.

The operation of the embodiment of FIG. 5 will now be outlined.

An adder 28 makes addition of a speed control signal FV output from the microcomputer 23-2 and a phase comparison signal PC from the phase comparator 25-2, and the output thereof is subjected to PWM at the threshold level to be determined by the variable resistor 36 of a comparator 29 after being integrated by a filter comprised of the variable resistor 35 and a capacitor 37. The PWM signal from the comparator 29 is entered to a driver 30, drives a motor 31, and controls so that the reference frequency signal FS according to motor speed command from a ten-key keyboard 21 and the feedback signal FG become the fixed phase difference relation.

Control procedure of phase comparison and speed will now be described with reference to flow charts of FIG. 6A through FIG. 6C and a waveform diagram of FIG. 4. (1), (2), ... in FIG. 6A through FIG. 6C denote step numbers. The flow charts are stored in a ROM in the microcomputer 23-2 in the form of programs.

The speed of the motor 31 (scale factor) is entered from the ten-key keyboard 21 (1). When there is a change in the set value (2), the set value (data) is set to the first counter 23A-2 (3), and the counter 23A-2 is caused to start count down. Now, after the completion of count down at the first counter 23A-2, an interrupt signal is generated, the set value is set again automatically, and counter count down is performed. A series of these operations are repeated. As a result, the reference signal FS is generated. This reference frequency signal FS is fed to the phase comparator 25-2.

The speed control signal FV will now be described.

FG interruption is started at the fall of the feedback signal FG from the encoder 32, after the register is stored (11) the speed control signal FV is reset (12), a timer value for ½FS of the reference frequency signal FS corresponding to the scale factor is set to the second counter 23B-2, the second counter 23B-2 is started (13), and the operation is returned after register restoration (14). After the completion of count down at the second counter 23B-2, FV interruption is generated. After storing register (21), a speed control signal FV of FIG. 4 is generated by setting the speed control signal FV (22), and the register is restored (23).

When the phase difference is 0 to $2\pi$ as shown in FIG. 4, setting and resetting of phase comparison signal PC are repeated at the fall of the reference frequency signal FS and the feedback signal FG. When the phase of the feedback signal FG lags more than $2\pi$, the phase comparison signal PC maintains the set state, and after the detection of twice fall of the feedback signal FG during a period of the reference frequency signal FS, aforementioned operation at the time of phase difference 0 to $2\pi$ is repeated. Conversely, when the phase of the feedback signal FG advances, that is, when the phase difference becomes below zero (0), the aforementioned operation at the time of phase difference 0 to $2\pi$ is repeated after the detection of the fall of the reference frequency signal FS twice during a period of the feedback signal FG.

In addition, the phase comparator 25-2 outputs "00" when the phase difference is 0 to $2\pi$, "01" when the delay of the feedback signal FG is more than $2\pi$ phase difference, and "10" 2 bit lock data when the phase difference between the feedback signal FG and the reference frequency signal FS is not more than zero (0). The later-mentioned microcomputer 23-5 reads it, and performs control in the FG interruption routine.

Though in the above embodiment the reference clock of the first counter 23A-2 is created by the external oscillator 22, a reference clock FS may be created using an internal clock in the microcomputer 23-2.

Figure 7:
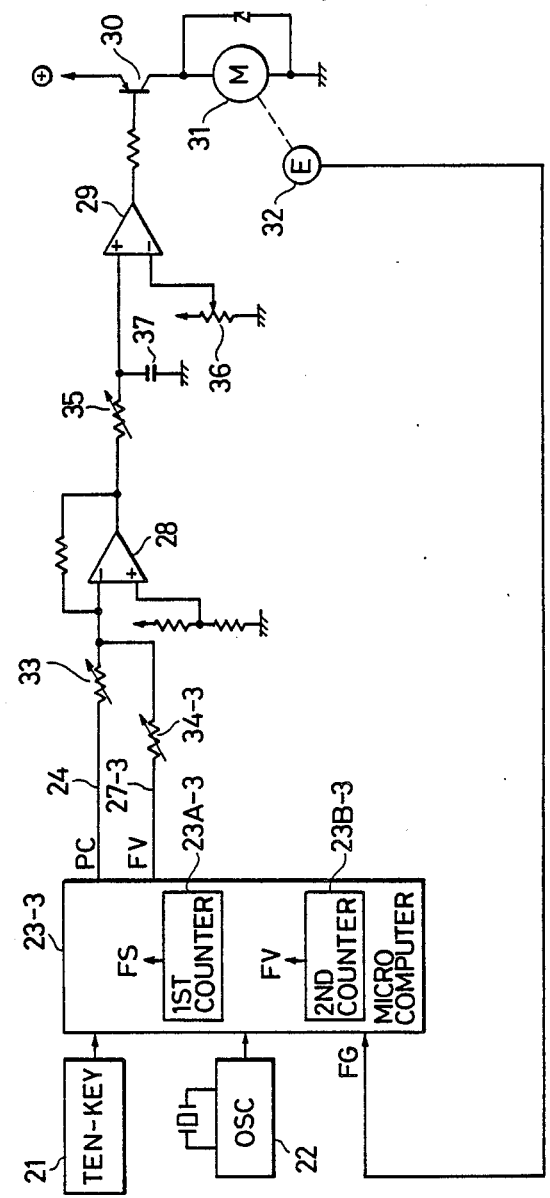
FIG. 7 is a circuit diagram showing a third embodiment of the present invention.

FIG. 7 is a circuit diagram of the third embodiment of the present invention.

In FIG. 7, similar reference characters denote elements having functions similar to the elements of FIG. 2, and the description thereof is omitted.

In FIG. 7, 23-3 is a microcomputer for speed control, and has a first counter 23A-3, and a second counter 23B-3. The first counter 23A-3 counts clock of an oscillator 22, and generates a reference frequency signal FS for the phase comparison according to the motor speed designation from a ten-key keyboard 21. The second counter 23B-3 generates a speed control signal FV of a fixed width synchronized with the feedback signal FG from the later-mentioned encoder according to the motor speed designation. This feed-back signal FG is fed to the interrupt terminal of the microcomputer 23-3. 27-3 is an output line. 32 is an encoder for detecting the rotation speed of a motor 31, generates a feedback signal FG, and enters the signal FG to the microcomputer 23-3. 33, 34-3, 35, and 36 are variable resistor.

Similar to the circuit of FIG. 2, the circuit of FIG. 7 creates a reference frequency signal FS by setting a count value corresponding to the scale factor of the first counter 23A-3.

The operation of the embodiment of FIG. 7 will be outlined.

An adder 28 performs addition of the speed control signal FV outputted from the microcomputer 23-3 and the phase comparison signal PC, the output thereof is integrated at a filter comprised of the variable resistor 35 and a capacitor 37 and pulse-width-modulated (PWM) by the threshold level determined by the variable resistor 36 of a comparator 29. The PWM signal from the comparator 29 drives the motor 31 via the driver 30, and controls the motor 31 so that the reference frequency signal FS according to the motor speed command from the ten-key keyboard 21 and the feedback signal FG become a predetermined phase difference.

Control procedure of phase comparison and speed will be described with reference to flow charts of FIG. 8A through FIG. 8D and a waveform diagram of FIG. 4. The flow charts of FIG. 8A through FIG. 8D are stored in a ROM in the microcomputer 23-3 in the form of programs. (1), (2), ... denote step numbers.

The speed of the motor 31 (scale factor) is entered from the ten-key board 21 (1). When there is any change in the set value (data) (2), a set value (data) is set to the first counter 23A-3 (3), and count down is started. Here, after the completion of count down of the first counter 23A-3, an interrupt signal is generated, a set value is set again automatically, and count down is performed. A series of the above operations are repeated. As a result, a reference frequency signal FS is generated.

The speed control signal FV will now be described.

FG interruption is started at the fall of the feedback signal FG from the encoder 32 of the motor 31, the register is stored (31), the speed control signal FV is reset (32), a timer value that makes ½FS of the reference frequency signal FS corresponding to the scale factor is set to the second counter 23B-3, and the counter 23B-3 is started (33). After the completion of count down of the second counter 23B-3, an FV interruption is generated, the register is stored (51), and a speed control signal FV of FIG. 4 is generated by setting the speed control signal FV (52). Then, the register is restored (53).

Setting and resetting of the phase comparison signal PC are repeated at the fall of the reference frequency signal FS and the feedback signal FG when the phase difference is 0 to $2\pi$ as shown in FIG. 4. When phase of the feedback signal FG lags more than $2\pi$, after the detection of the fall of the feedback signal FG twice in a period of the reference frequency signal FS, aforementioned operation when the phase difference is 0 to $2\pi$ is repeated. On the other hand, when the phase of the feedback signal FG leads, that is, when the phase difference becomes below 0, the phase comparison signal PC maintains the reset status, and the aforementioned operation when the phase difference is 0 to $2\pi$ is repeated after the detection of the fall of the reference frequency signal FS twice in a period of the feedback signal FG.

The operation will be further described with reference to FIG. 8B through FIG. 8D.

As shown in FIG. 4, since the condition is always FS inhibit flag reset and FG input counter=1 when the phase difference is 0 to $2\pi$, the PC port of the microcomputer 23-3 is set through steps (11), (12), (13) and (19) by the FS interrupt signal (20), the counter for counting the FG interruption frequency is cleared (16), then the counter for counting the FS interruption frequency is started to perform count up (17), interruption enable is performed concurrent with the register restoration (18), and the operation is returned.

In addition, since the condition is FG inhibit flag set and FS input counter=1, the PC port of the microcomputer 23-3 is reset (42) through steps (34), (35), and (41), the counter for counting the FS interruption frequency is cleared (38), the counter for counting the FG interruption frequency is caused to start count up (39), interruption enable is performed concurrent with the register restoration (40), and the operation is returned. The setting and resetting of the PC port are repeated by a series of the above steps.

That is, the FG interrupt signal and the FS interrupt signal are generated alternately.

When phase difference is more than $2\pi$ as shown in FIG. 4, since the condition is FS inhibit flag reset and FG input counter=1 initially, the PC port is set (20) through steps (11), (12), (13), and (19), the counter for counting the FG interruption frequency is cleared (16), the counter for counting the FS interruption frequency is caused to start count up (17), interruption enable is performed concurrent with the register restoration (18), and the operation is returned. Thereafter, the FS interrupt signal enters again. If the FG input counter="0" (13), the PC port is set (14), the FG inhibit flag is set (15), the counter for counting the FG interruption frequency is cleared (16) the counter for counting the FS interruption frequency is caused to start count up (17), interruption enable is performed concurrent with the register restoration (18), and the operation is returned. Since the condition is now FG inhibit flag set and FS input counter≠0, even when an FG interrupt signal is entered, a PWM signal for advancing the phase of the motor 31 is fed to the driver 30. As the phase of the feedback signal FG advances and an FG interruption signal is entered, and when the FS interruption frequency="0", the PC port is reset (44) through the judgment of steps (34) and (43), the FS inhibit flag and FG inhibit flag are reset (45), and the operation returns through steps (39) and (40). Thereafter, the operation when the phase difference is 0 to $2\pi$ is repeated.

On the other hand, when the phase of the feedback signal FG advances, the operation similar to the operation when the phase lags is performed except that the relation between FS and FG is interchanged, the driver 30 is driven so as to delay the phase of the motor 31 through steps (36), (37), . . . , (12), (21), (16), and (17), and control is performed so that the phase difference between the reference frequency signal FS and the feedback signal FG becomes 0 to $2\pi$.

Figure 9:
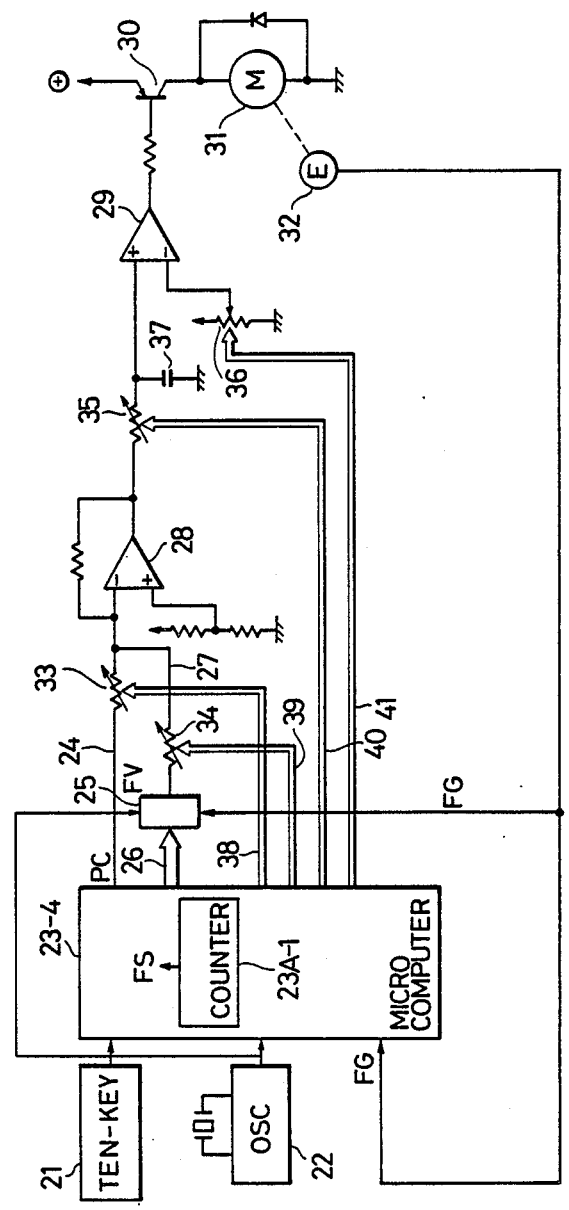
FIG. 9 is a circuit diagram showing a fourth embodiment of the present invention.

FIG. 9 is a circuit diagram of a fourth embodiment of the present invention.

In FIG. 9, similar reference characters denote elements having functions similar to the elements of FIG. 2, and the description thereof is omitted.

In FIG. 9, 38 is a PC gain control signal, 39 is an FV gain control signal, 40 is a filter control signal, 41 is a threshold level control signal, and adjustment is made by changing the value of variable resistor 33-36 as appropriate.

These signals are output from a microcomputer 23-4.

The operation of the circuit shown in FIG. 9 will be described.

The main operation is similar to the operation of the circuit of FIG. 2 except that values of the variable resistors 33-36 are set to values predetermined according to the specified scale factor by the microcomputer 23-4, and the addition gain ratio of the phase comparison signal PC and the speed control signal FV, filter characteristics, and comparator threshold level are controlled.

Control procedure of phase comparison and speed will be described with reference to flow charts of FIG. 10A through FIG. 10C and a waveform diagram of FIG. 4. The flow charts are stored in a ROM in the microcomputer 23-4 in the form of programs. (1). (2), . . . in FIG. 10A through FIG. 10C denote step numbers.

Since steps (1) through (4) are similar to steps (1) through (4) of 3A, the description thereof is omitted. In step (5), gain of the phase comparison signal PC corresponding to the scale factor, gain of speed control signal FV, filter characteristics, threshold level of comparator 29 are set.

Steps (11) through (23) and steps (31) through (44) are similar to steps (11) through (23) and steps (31) through (44) of 3B, 3C, therefore the description thereof is omitted.

Regarding the filter adjustment, the same purpose may be attained by adapting to switch the capacitor 37. The same applies to other embodiments described below.

Figure 11:
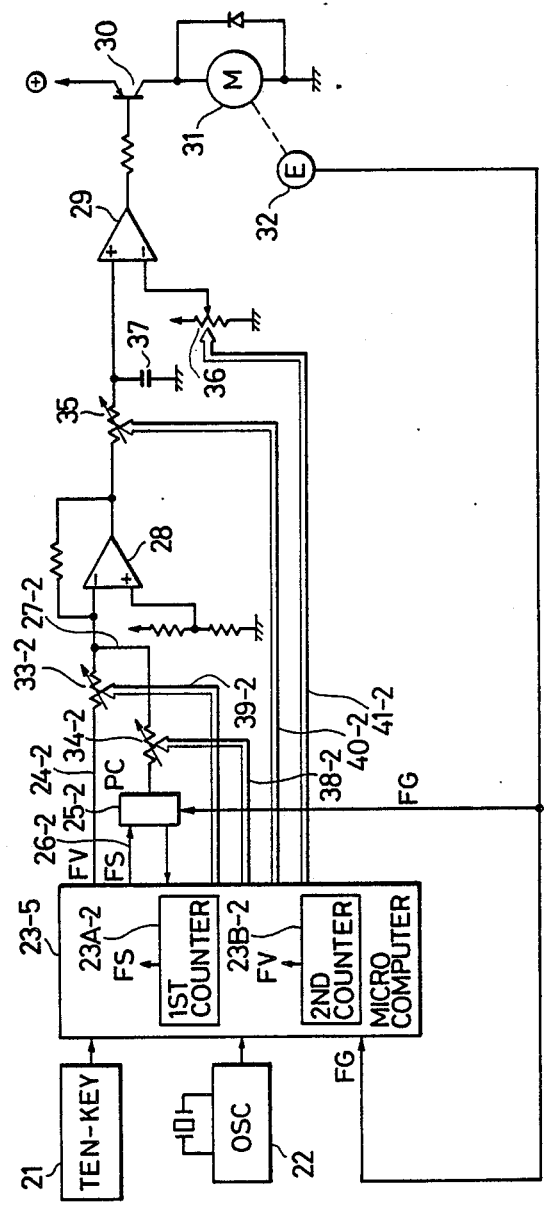
FIG. 11 is a circuit diagram showing a fifth embodiment of the present invention.

FIG. 11 is a circuit diagram of a fifth embodiment of the present invention.

In FIG. 11, similar reference characters denote elements having function similar to the elements of FIG. 5, and the description thereof is omitted. Portions which differ from FIG. 5 will be mainly described here.

In FIG. 11, 39-2 is an FV gain control signal, 38-2 is a PC gain control signal, 40-2 is a filter control signal, and 41-2 is a threshold level control signal, and the adjustment thereof is performed by changing values of variable resistors 33-2, 34-2, 35, and 36. These signals are output from a microcomputer 23-5.

The operation of the circuit shown in FIG. 11 will now be described.

The main operations are similar to those of the circuit shown in FIG. 5, except that in, the circuit shown in FIG. 11 the variable resistors 34-2, 33-2, 35, and 36 are set to values predetermined according to the specified scale factor by the microcomputer 23-5, and the addition gain ratio of the phase comparison signal PC and the speed control signal FV2, filter characteristics, and threshold level are controlled.

The control procedure of phase comparison and speed will be described with reference to flow charts of 12A through 12C and a waveform diagram of FIG. 4. Flow charts of 12A through 12C are stored in the ROM in the microcomputer 23-5 in the form of programs.

Figure 6A:
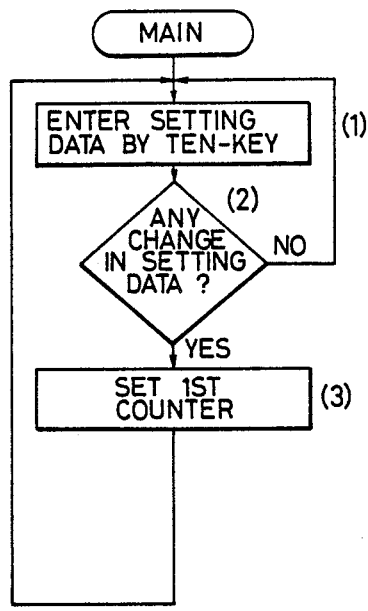
FIG. 6A through FIG. 6C are flow charts for illustrating the operation of FIG. 5.

Since steps (1) through (3) are similar to steps (1) through (3) of FIG. 6A, the description thereof is omitted. In step (4), each of the variable resistors 34-2, 33-2, 35 and 36 are set to a value corresponding to the scale factor.

Figure 6B:
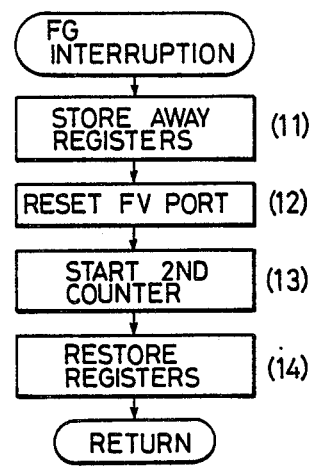
Figure 6C:
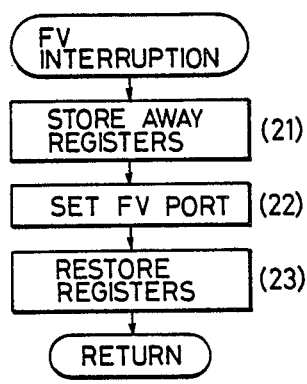

In addition, since steps (11) through (14) and steps (21) through (23) are similar to steps (11) through (14) and steps (21) through (23) of FIGS. 6B and 6C, the description thereof is omitted.

Adjustment of filter characteristics may be made by switching the capacitor 37 in lieu of using the variable resistor 35.

Figure 13:
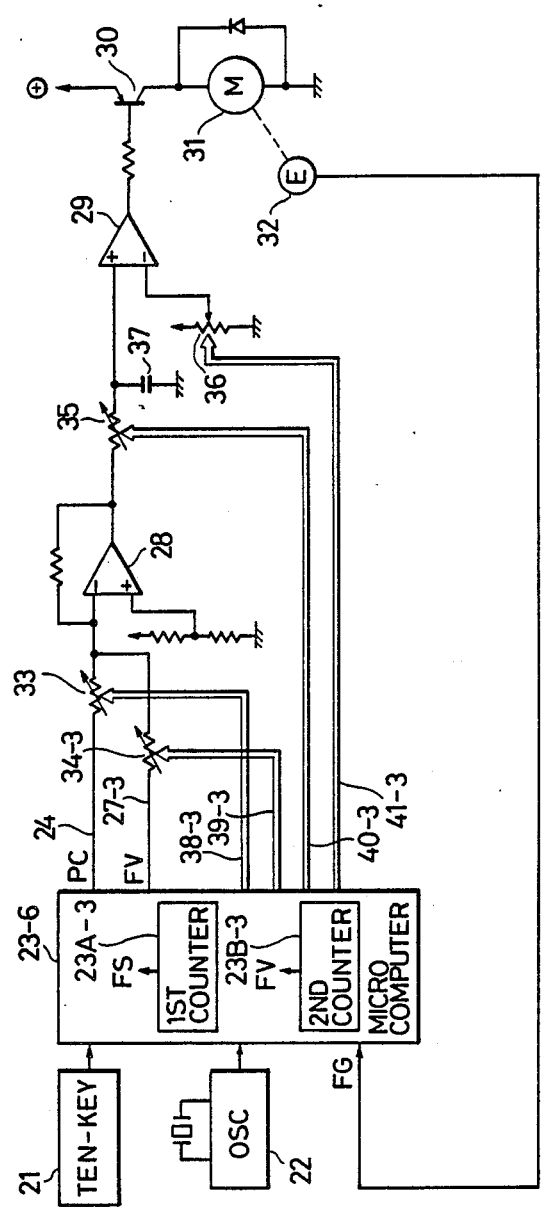
FIG. 13 is a circuit diagram showing a sixth embodiment of the present invention.
Figure 14B:
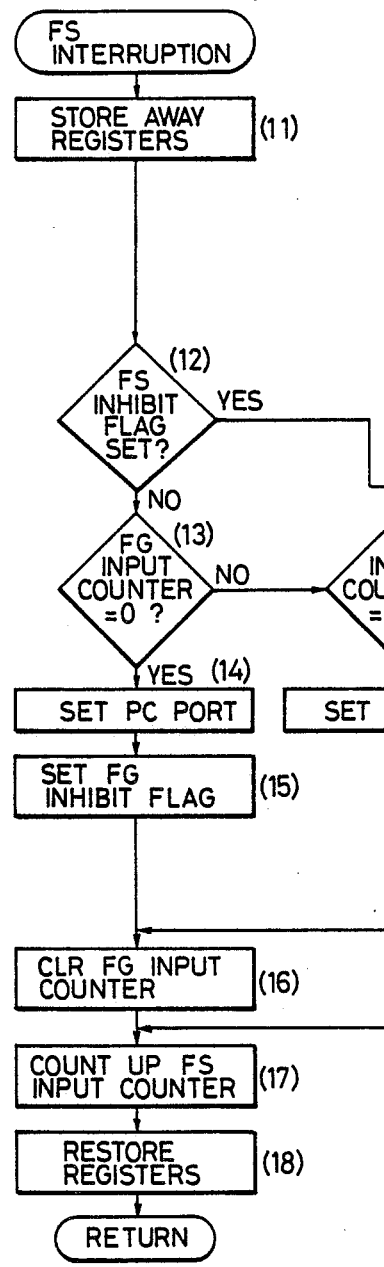
Figure 14A:
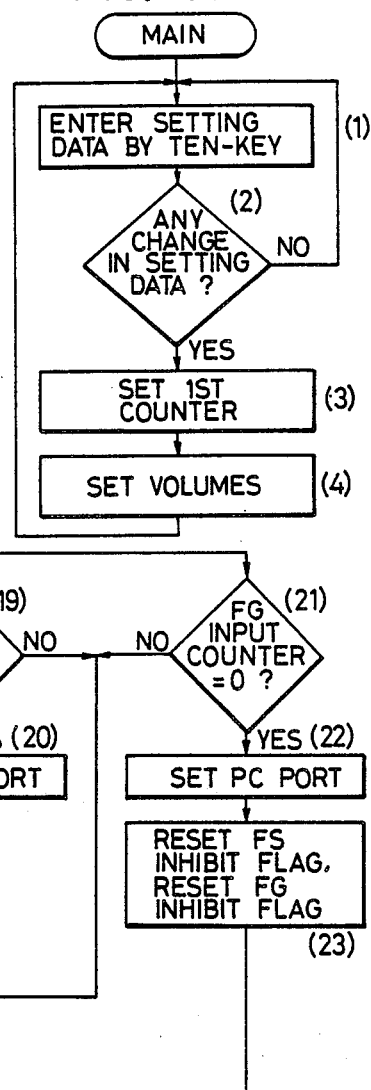

FIG. 13 is a circuit diagram of a sixth embodiment of the present invention.

In FIG. 13, similar reference characters denote elements of functions similar to the elements of FIG. 7, and therefore the description thereof is omitted. Only portions which differ from FIG. 7 will be described here.

In FIG. 13, 38-3 is a PC gain control signal, 39-3 is an FV gain control signal, 40-3 is a filter control signal, 41-3 is a threshold level control signal, and adjustment is made by changing the value of appropriate variable resistor 33, 34-3, 35, 36. These signals are output from a microcomputer 23-6.

The operation of the circuit shown in FIG. 13 will be described.

Main operations are similar to those of the circuit shown in FIG. 7, except that in the circuit shown in FIG. 13 the variable resistors 33, 34-3, 35 and 36 are set to values predetermined according to the specified scale factor by the microcomputer 23-6 thereby controlling the addition gain ratio of the phase comparison signal PC and the speed control signal FV, filter characteristics, and threshold level.

The control procedure of phase comparison and speed control will be described with reference to flow charts of FIG. 14A through FIG. 14D and a waveform diagram of FIG. 4. The flow charts of FIG. 14A through FIG. 14D are stored in the ROM in the microcomputer 23-6 in the form of programs. (1), (2), ... in FIG. 14A through FIG. 14D denote step numbers.

Since steps (1) through (3) are similar to steps (1) through (3) of FIG. 8A, the description thereof is omitted. In step (4), a value corresponding to the scale factor is set to each of the variable resistors 33, 34-3, 35 and 36.

In addition, since steps (11) through (18) and steps (31) through (45) and steps (51) through (53) are similar to steps (11) through (18), steps (31) through (45), and steps (51) through (53) of FIGS. 8B through 8D, the description thereof is omitted.

In addition, filter characteristics may be adjusted by switching the capacitor 37 instead of using the variable resistor 35.

A seventh embodiment of the present invention will now be described with reference to FIG. 7.

Since the circuit used in this embodiment is similar to the circuit of FIG. 9, the description thereof is omitted. Accordingly, only the portions which differ from FIG. 9 and the operation described in FIG. 10A through FIG. 10C will be described.

In this embodiment, when the phase is not locked as a result of the phase comparison for which judgment is made in the microcomputer 23-4, control of the threshold level of the comparator 29 is also performed. As a result, a stable phase control can be performed.

Figure 15C:
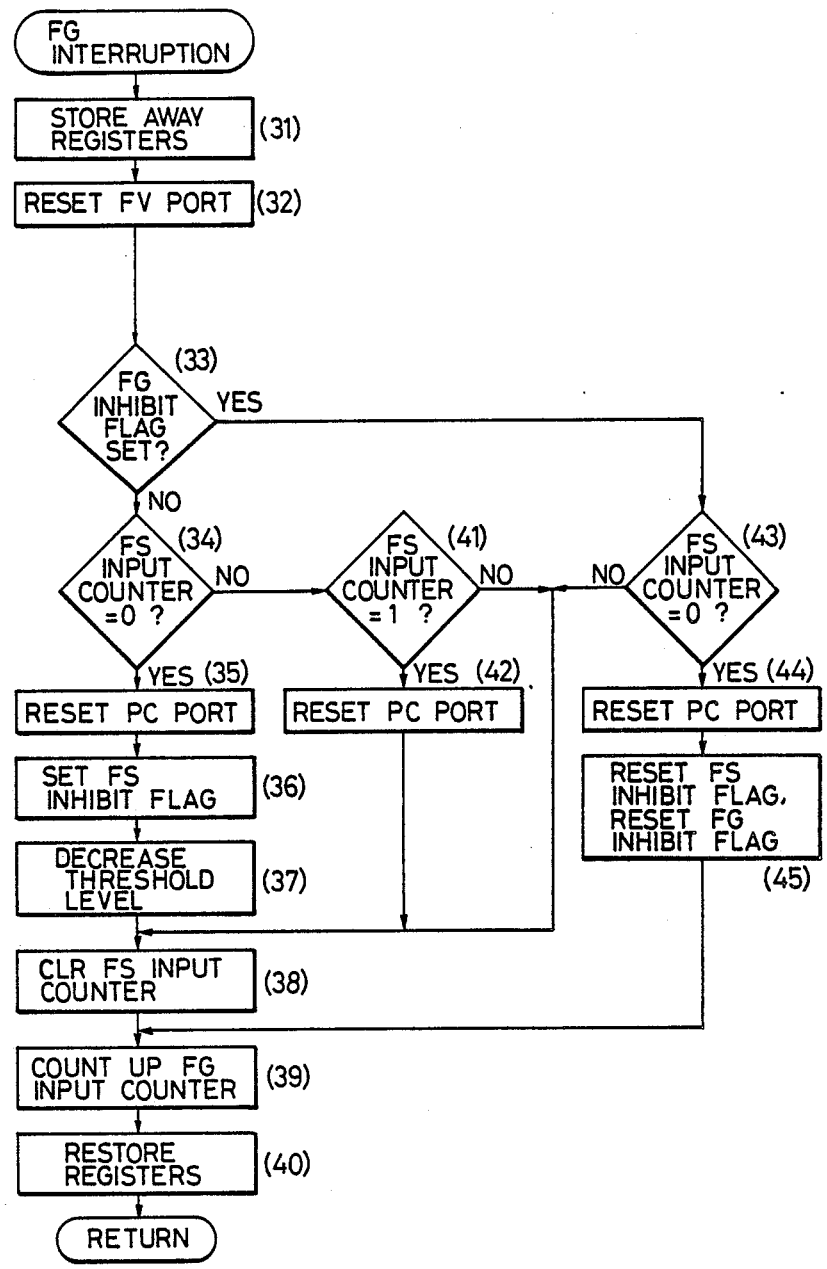

The control procedure of phase comparison and speed will be described with reference to flow charts of FIG. 15A through FIG. 15C and a waveform diagram of FIG. 4. The flow charts of FIG. 15A through FIG. 15C are stored in the ROM in the microcomputer 23-4 in the form of programs. (1), (2), ... in FIG. 15A through 15C denote step numbers.

Figures 10A, 10B:
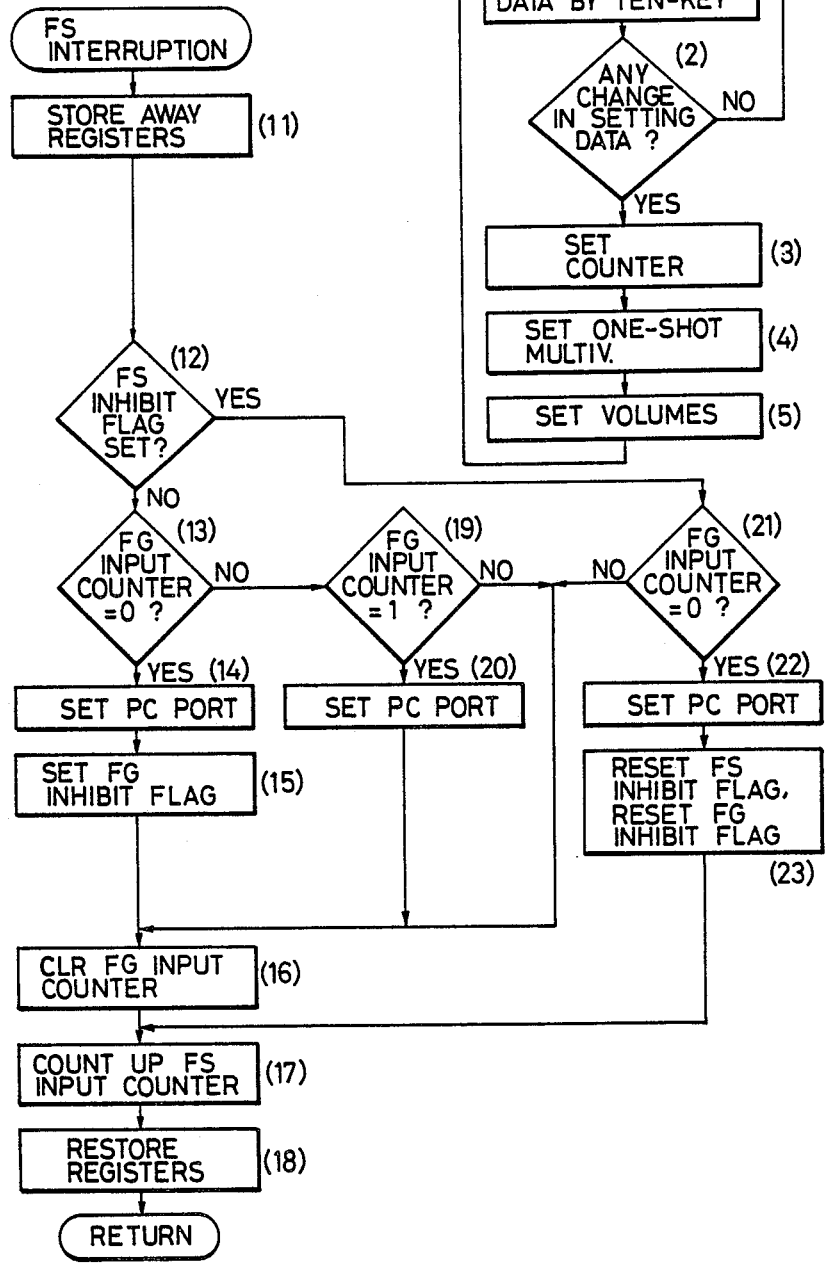
FIG. 10A through FIG. 10C are flow charts for illustrating the operation of FIG. 9.

Since steps (1) through (5) are similar to steps (1) through (5) of FIG. 10A, the description thereof is omitted.

Figure 10C:
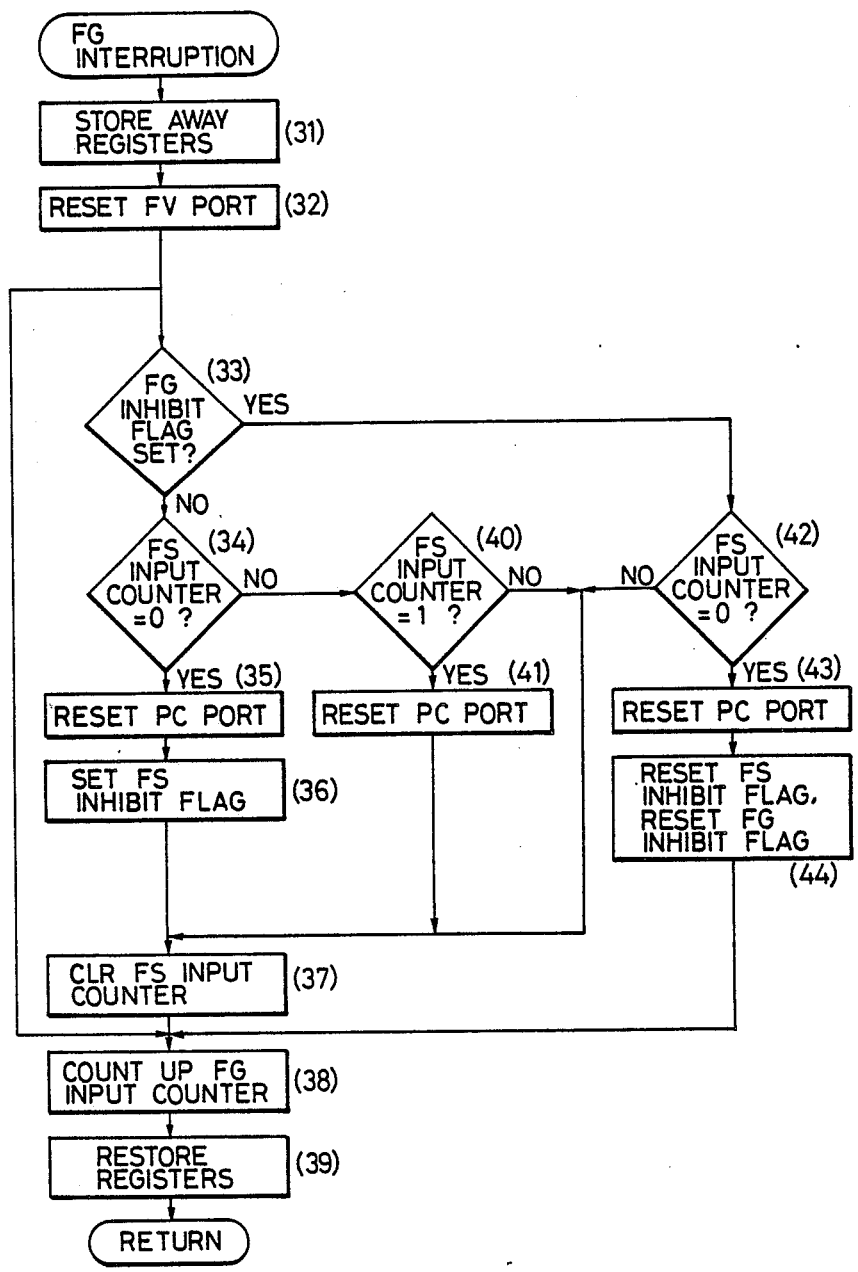

In addition, steps (11) through (15), (17) through (24), (31) through (36), and (38) through (45) of FIG. 15B and FIG. 15C are similar to steps (11) through (15), (16) through (23), (31) through (36), and (37) through (44) of FIG. 10B and FIG. 10C. The description here will be limited to steps (16) and (37).

Referring to FIG. 4, when the phase difference is more than $2\pi$, since the condition is FS inhibit flag reset and FG input counter = 1 initially, the PC port is set (21) through steps (11), (12), (13) and (20), the counter for counting the FG interruption frequency is cleared (17), the counter counting the FS interruption frequency is caused to make count up (18), interruption enable is performed concurrent with the register restoration (19) and the operation returns. Since thereafter an FS interrupt signal enters again, if FG input counter = 0 (13), the PC port is set (14), the FG inhibit flag is set (15). and the value of the electronic volume 36 is increased (16) by the threshold level control signal 41 so that the threshold level of the comparator 29 rises. Since steps following step 17 are similar to those described in connection with FIG. 10B and FIG. 10C, the description is omitted here.

On the other hand, when the phase of the feedback signal FG leads, the operation similar to the operation when the phase lags is performed except that the relation between FS and FG is interchanged, the driver 30 is driven through steps (35) through (37), ... (12), (22), (17) and (18) so as to delay the phase of the motor 31 and controlled so that the phase difference becomes 0 to $2\pi$.

In addition,, in step (37) the value of the variable resistors 36 is decreased by the threshold level control signal 41 so that the threshold level of the comparator 29 decreases.

In addition, in the threshold level increase and decrease steps (16) and (37), it may be designed to adjust other control signal in lieu of adjusting the variable resistor 36. The same applies to other embodiments to be described below.

A fifth embodiment of the present invention will now be described.

Since the circuit of this embodiment is similar to the circuit of FIG. 11, circuit description is omitted. Mainly the portions which differ from FIG. 11 and the operation described in connection with FIG. 12A through FIG. 12C will be described.

In this embodiment, the control of the threshold level is performed by a lock data of the phase comparator 25-2. As a result, a stable phase control can be performed.

The control procedure of phase comparison and speed will be described with reference to flow charts of FIG. 16A through FIG. 16C, and a waveform diagram of FIG. 4.

Figure 16A:
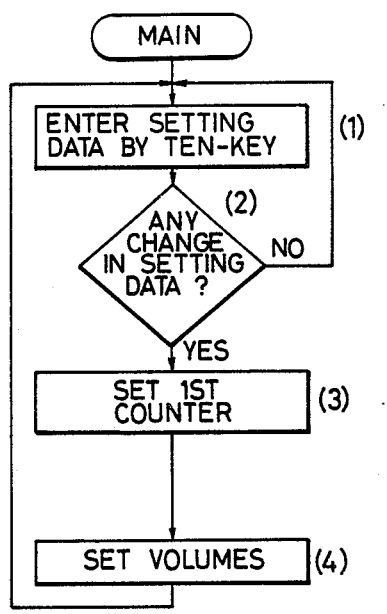
FIG. 16A through FIG. 16C are flow charts for illustrating an eighth embodiment of the present invention.
Figure 16B:
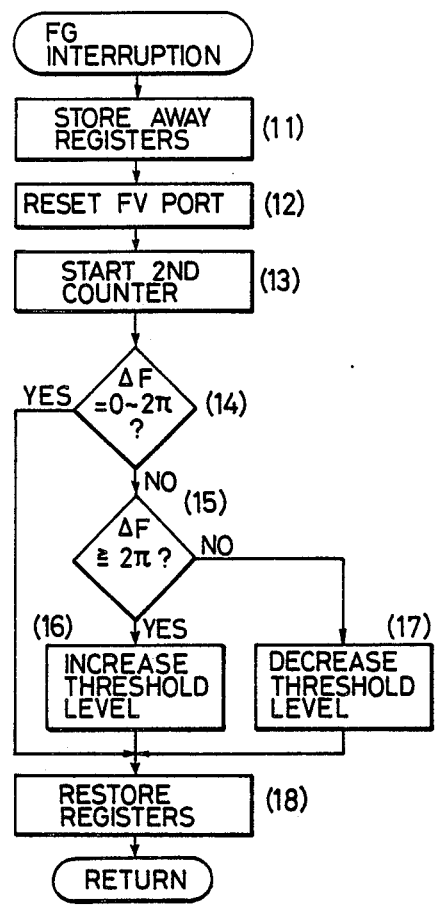
Figure 16C:
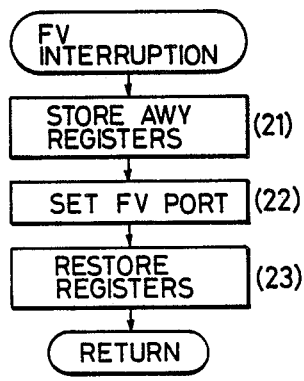

The flow charts of FIG. 16A through FIG. 16C are stored in the ROM of the microcomputer 23-5 in the form of programs. (1), (2), ... in FIG. 16A through FIG. 16C denote step numbers.

Figure 12A:
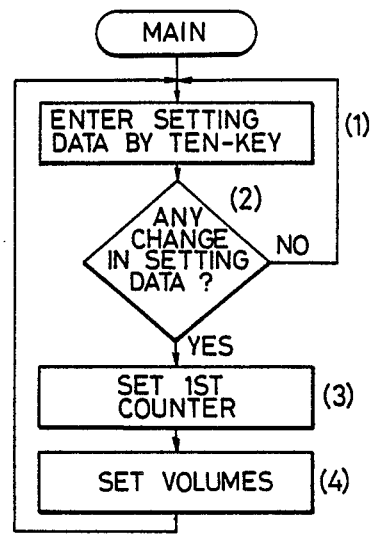
FIG. 12A through FIG. 12C are flow charts for illustrating the operation of FIG. 11.
Figure 12B:
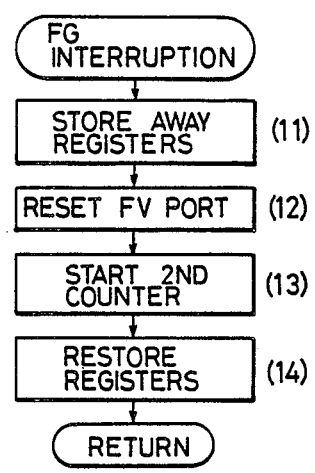
Figure 12C:
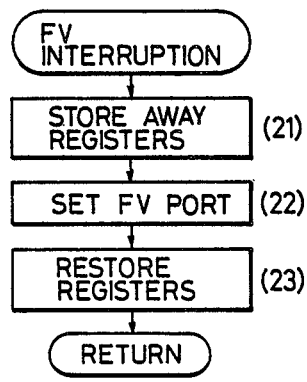

Since steps (1) through (4) are similar to steps (1) through (4) of FIG. 12A, the description thereof is omitted.

The speed control signal FV will be described. FG interruption is started at the fall of the feedback signal FG from the encoder 32, the register is stored (11), the speed control signal FV is reset (12), the second counter 23B-2 is started (13) setting a time value to cause ½FS of the reference frequency signal FS corresponding to the scale factor, and if the phase difference is 0−2π (14), the register is restored (18), and the operation is returned. If the phase difference is not 0−2π but more than 2π (15), the threshold level is increased (16), if otherwise, the threshold level is decreased (17), the register is stored (18), and the operation returns. After the completion of count down of the second counter 23B-2, an FV interruption generates, the register is stored (21), speed control signal FV is set (22), the speed control signal FV of FIG. 4 is generated thereby, the register is stored (23), and then the operation returns.

A ninth embodiment of the present invention will now be described. Since the circuit of this embodiment is similar to the circuit of FIG. 13, circuit description is omitted. Only the portions which differ from FIG. 13 and the operation described in FIG. 14A through FIG. 14D will be described here.

In this embodiment, when the phase is not locked as judged by the phase comparison in the microcomputer 23-6, the control of the threshold level of the comparator 29 is also performed. A stable phase control can be performed thereby.

Figures 17A, 17B:
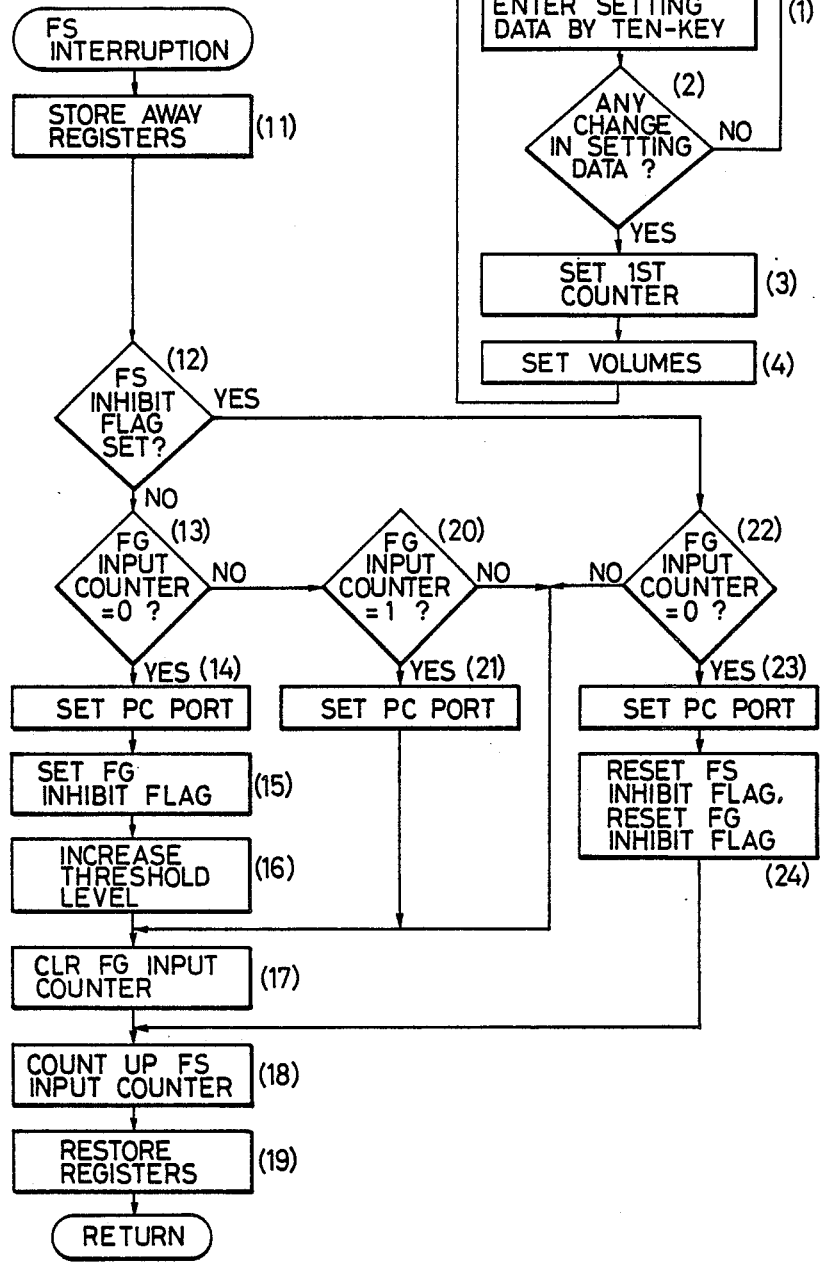

The control procedure of phase comparison and speed will be described with reference to flow charts of FIG. 17A through FIG. 17D and the waveform diagram of FIG. 4. The flow charts of FIG. 17A through FIG. 17D are stored in the ROM in the microcomputer 23-6 in the form of programs Since steps (1) through (4) are similar to steps (1) through (4) of FIG. 14A, the description thereof is omitted. In addition, steps (11) through (15), (17) through (24), (31) through (37), and (39) through (46) of FIG. 17B through FIG. 17D are similar to steps (11) through (15), (16) through (23), (31) through (37), and (38) through (45). The description here will be limited to steps (16) and (38)

In the case of phase difference>2π of FIG. 4, since the initial condition is FS inhibit flag reset and FG input counter=1, the PC port is set (21) through steps (11), (12), (13) and (20) similar to the above, the counter for counting the FG interruption frequency is cleared (17), the counter for counting the FS interruption frequency is caused to make count up (18), interruption enable is performed (19) concurrent with the register restoration, and the operation returns. Then, since the FS interrupt signal enters once again, is FG input counter=0 (13), the PC port is set (14), the FG inhibit flag is set (15), and the threshold level of the comparator 29 is increased (16). This threshold level increase is performed by controlling the value of the electronic volume 36 by the threshold level control signal 41-3. Since steps following step 17 are similar to those described in connection with FIG. 14B through FIG. 14D, the description thereof is omitted.

On the other hand, when the phase of the feedback signal FG leads, the operation similar to the operation when the phase lags is performed except that the relation between FS and FG interchanges. The driver 30 is driven so that the phase of the motor 31 delays through steps (36) through (38), . . . (12), (22),

(17) and (18), and controlled so that phase difference 0−2π is obtained.

In addition, in step (38), the value of the electronic volume 36 is decreased by the threshold level control signal 41-3 so that the threshold level of the comparator 29 is decreased.

In steps (16) and (38) for increasing and decreasing the threshold level, instead of adjusting the threshold level control signal 19, it may be adapted to adjust other control signal.

A tenth embodiment of the present invention will now be described.

Figure 18:
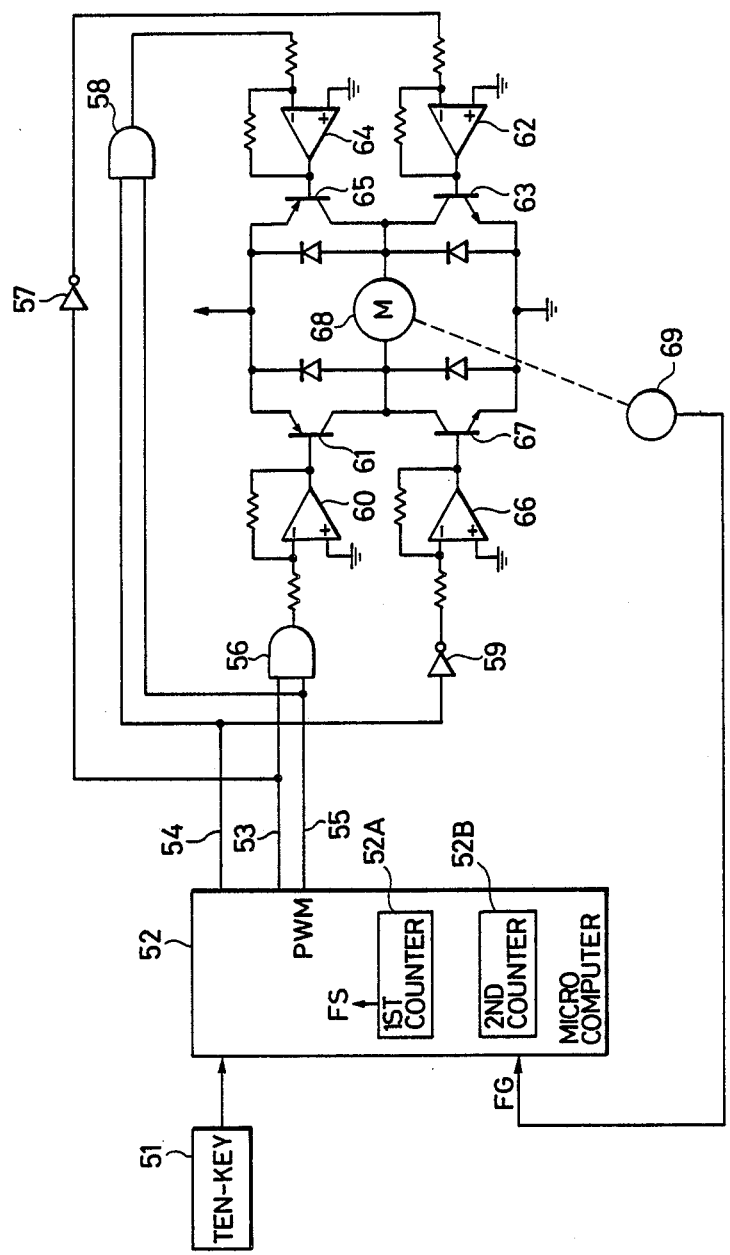
FIG. 18 is a circuit diagram of a tenth embodiment of the present invention.

FIG. 18 is a block diagram of the 10th embodiment. In FIG. 18, 51 is a ten-key keyboard for specifying the speed (changed scale factor) of the motor speed, 52 is a microcomputer for the speed control. The microcomputer has interruption function, a first counter 52A, and a second counter 52B. The first counter 52A counts internal clock, and generates a reference frequency signal FS (frequency is also indicated. The same applies to the following) for the phase comparison according to the motor speed designation via the ten-key 51. The second counter performs counting for generating a PWM signal from the phase error signal by the internal clock. 53 is a forward ON signal, 54 is a backward ON signal, 55 is a PWM signal for driving the motor, 56 and 58 are AND circuits, 57 and 59 are NOT circuits, 60, 62, 64 and 66 are amplifiers for amplifying the PWM signal 55, 67 is a driver for driving a motor, 68 is a motor, 69 is an encoder for detecting the rotation speed of the motor 68, and FG is a feedback signal from the encoder 69.

The operation of the embodiment of FIG. 18 will be outlined. The AND circuit 56 is opened by the forward ON signal 53, and allows the PWM signal 55 outputted from the microcomputer 52 to pass. The PWM signal 55 is amplified at the amplifier 60, and drives the driver 61. The forward ON signal 53 is reversed at the NOT circuit 57, amplified at the amplifier 62, and drives the driver 63. As a result, the PWM signal 55 is applied to the motor 68, and controls so that the phase difference between the reference frequency signal FS according to the motor speed command and the feedback signal FG from the encoder 69 becomes constant.

At this time (in forward movement), the backward ON signal 54 is kept from opening the AND circuit 58 and the NOT circuit 59. The operation in the backward movement is similar to the operation in the forward movement.

The control procedures of phase comparison and the PWM signal 5 will be described with reference to flow charts of FIG. 19A through FIG. 19D and a waveform diagram of FIG. 20. (1), (2), ... in FIG. 19A through FIG. 19D denote step numbers. The flow charts of FIG. 19A through FIG. 19D are stored in the ROM of the microcomputer 52 in the form of programs.

The principle of generating the PWM signal will now be described in connection with FIG. 20. The reference frequency signal FS is a signal of a fixed frequency determined by the input of the ten-key keyboard 51. Since the feedback signal FG is a signal from the encoder 69 of the motor 68, it is generated only when the motor 68 starts rotation. If the speed of the motor 68 agrees with the reference frequency signal FS (those two agree when the phase difference is between 0 and 2π), the phase difference ΔP between the reference frequency signal FS and the feedback signal FG is between 0 and 2π. The above phase difference ΔP is detected through the counting of internal clock of the microcomputer 52 by the first counter 52A. ON time Von in the PWM signal 55 can be calculated by $$V_{on} = \Delta P \times K + C$$

where K is a constant and C is a constant based on the scale factor.

The pulse width (OFF time) of the PWM signal 55 is $$PWM = FS - V_{on}.$$

The above arithmetic operation is performed in the microcomputer 52, and a PWM signal is output to control so as to synchronize the motor 68 with the reference frequency signal FS.

It is designed that the phase difference value which is obtained by the previous measurement and stored in the buffer memory is used as the phase difference ΔP for the arithmetic operation shown above to prevent delay due to arithmetic operation.

The phase comparison will be described with reference to FIG. 19A through FIG. 19B. The speed (scale factor) of the motor 68 is entered via the ten-key keyboard (1). When there is any change in setting data (2), the setting data is set to the first counter 52A (3) causing it to start count down. Here, after the completion of the counting of the first counter 52A, an interrupt signal is generated, the setting data is set automatically again, counting is repeated, and the reference frequency signal FS is generated. Further, a bias value corresponding to "C" above suitable to the speed of the motor 68 is set (4).

The setting and resetting of the phase error signal PC are repeated at the fall of the reference frequency signal FS and the feedback signal FG when the phase difference is 0 to 2π as shown in FIG. 20. When the phase of the feedback signal FG lags, the phase error signal PC maintains the set state, and the operation in the case of phase difference 0 to 2π is repeated after the detection of the fall of the feedback signal FG twice in a period of the reference frequency signal FS (for example, time t). On the other hand, when the phase of the feedback signal FG leads, the phase error signal PC maintains the reset state, and the aforementioned operation in the case of phase difference 0 to 2π is repeated after the detection of the fall of the reference frequency signal FS twice in a period of the feedback signal FG.

The operation will be further described with reference to FIG. 19A and FIG. 19B.

As shown in FIG. 20, since when the phase difference between the reference frequency signal FS and the phase error signal PC is 0 to 2π, the phase error signal PC is always in the condition of FS inhibit flag reset, FG input counter=1, and FG inhibit flag reset, the counter for counting the FG interruption frequency is cleared (15) by the FS interrupt signal through steps (11), (12), (13), (18) and (19), the counter for counting the FS interruption frequency is caused to make count up (16), interruption enable is performed concurrent with the register restoration (17), and the operation returns.

Figures 19C, 19D:
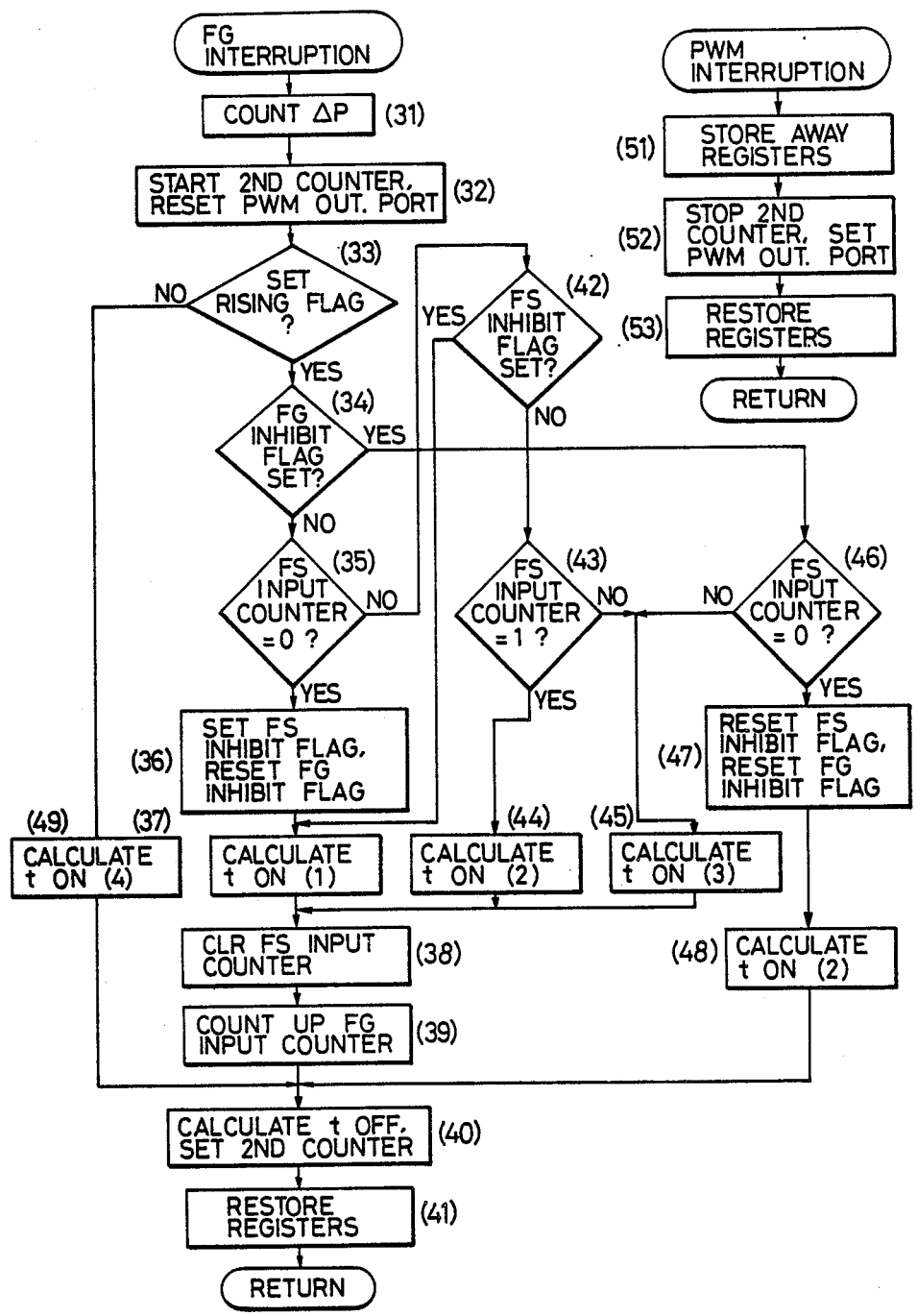

As shown in FIG. 19C and FIG. 19D, by the FG interrupt signal, the time (phase difference ΔP) from the fall of the previous reference frequency signal FS to the fall of the feedback signal FG is read (31) sharing the first counter 52A for generating the reference frequency signal FS. Then, the second counter 52B (PWM counter) for the PWM output is started, and the PWM output port is reset (32) to cause the motor 68 off. Whether or not the motor gained the desired speed is judged by checking the rise flag (judged "gained" when FG interruption enters twice in a period of FS) (33). If the motor has already gained the desired speed, since the condition is FG inhibit flag=reset, FS input counter=1, and FS inhibit flag=reset, in motor ON time calculation 2 (44) ON time $t_{on}$ of the motor 68 in the condition of phase difference 0−2π is calculated using the phase difference ΔP through steps (34), (35), (42) and (43). Then, the FS input counter for counting the FS interruption frequency is cleared (38), then the FG input counter for counting the FG interruption frequency is caused to make count up (39), motor OFF time $t_{off}$(FS - $t_{on}$) is obtained, the count value of motor OFF time $t_{off}$ is set to the second counter 52B (40, the register is restored (41), and the operation returns.

On the other hand, when counting is made up to the count value of the second counter 52B, a PWM timer interruption generates, the register is stored (51), the second counter 52B is stopped, the PWM output port is set so that the motor becomes ON (52), and this state continues until the entry of the FG interruption.

In the range of phase difference from 0 to 2π the operation such as above is repeated, and control is performed so that the phase difference becomes constant. Then, the register is restored (53), and the operation returns.

In the range of phase difference is 2π or more, since the initial condition is FS inhibit flag=reset, FG input counter=1, and FG inhibit flag=reset, the FG input counter is cleared (15) through steps (12), (13), (18) and (19), the FS input counter for counting the FS interruption frequency is caused to make count up (16), the register is restored, interruption enable is performed (17), and the operation returns. Since the phase has lagged more than 2π, FS interruption shown in FIG. 19A and FIG. 19B enters once again before the FG interruption. Since the condition is FG inhibit flag=reset and FG input counter=0, the FG inhibit flag is set (14) through steps (12) and (13), the FG input counter is cleared (15), the FS input counter is caused to make count up (16), the register is restored (17), and the operation returns.

Then, FG interruption enters, the count value from the previous second interruption to the present FG interruption is read (31) as shown in FIG. 19C and FIG. 19D, the second counter 52B which is a PWM timer is started, and the PWM output port is reset (32) so as to cause the motor 68 to become OFF. At this time, the phase difference is from the fall of the first reference frequency signal FS to the fall of the present feedback signal FG. Then whether or not the motor has gained the desired speed is judged (33), since the condition is FG inhibit flag=set and FS input counter≠0, the operation goes to motor ON time calculation 3 (45), calculation is made so that the motor 68 becomes fast, i.e., so that ON time $t_{on}$ is lengthened, the FS input counter is cleared (38), the FS input counter is cleared (38), the FG input counter makes count up (39), motor OFF time $t_{off}$ is obtained, the count value is set to the second counter 52B (40), the register is restored (41), interrupt enable is effected, and the operation returns.

When the speed of the motor 68 increases (FG phase advances), FG interruption enters, and FG interruption frequency is 0, since the condition is FG inhibit flag=set and FS input counter=0, the FS inhibit flag and FG inhibit flag are set (47) through steps (34) and (46), motor ON time $t_{on}$ is calculated in motor ON time calculation 2 (48) so as to return the phase difference to the range of 0 to $2\pi$, and thereafter the operation returns after going through steps (40) and (41).

On the other hand, when the phase of FG leads (phase difference below 0), as shown in FIG. 19C and FIG. 19D, the count value from the previous FS interruption to the current FG interruption is read (31), the second counter 52B which is a PWM timer is started, and the PWM output port is reset to make the motor 68 OFF (32). Thereafter, whether or not the motor has gained the desired speed is judged (33), since the condition is FG inhibit flag=reset, FS input counter=1, and FS inhibit flag=reset, the operation goes to motor ON time calculation 2 through steps (34), (35), (42) and (43), motor ON time $t_{on}$ is calculated there, the FS input counter is cleared (38), the FG input counter for counting the FG interruption frequency is caused to make count up, and the operation returns after going through steps (39), (40) and (41).

Since the phase has advanced (phase difference<0), FG interruption shown in FIG. 19C and FIG. 19D enters once again before FS interruption, the count value from the previous FS interruption to the current interruption is read (31). Since the condition is FG inhibit flag=reset and FS input counter=0, FS inhibit flag is set and FG inhibit flag is reset (36) through steps (34) and (35). Thereafter, in motor ON time calculation 1 (37) calculation is made so that the motor speed is slowed down, i.e., so that ON time is shortened (may be shortened to 0), the FS input counter is cleared (38), the FG input counter is caused to make count up (39), motor OFF time $t_{off}$ is obtained, the resultant count value is set to the second counter 52B (40), the register is restored (41), and the operation returns.

When the motor 68 becomes slow (FG phase lag), FS interrupt is entered, and the FG interruption frequency is "0", since the condition is FS inhibit flag=set and FG input counter=0, the FG inhibit flag and FS inhibit flag are reset (22) through steps (12) and (21), the register is restored (17), and the operation returns.

Motor ON time calculation 4 (49) shown in FIG. 19C is a routine for calculating output from motor stop time to the time desired speed has been gained. In this embodiment, when FG interruption is twice entered during FS interruption at the time of motor start-up, the rising flag is set (20).

Although the present invention has been described in connection with the particular embodiments shown and discussed hereinabove, it is to be expressly understood that many other alterations and modifications may be made without departing from the spirit and scope of the present invention.

What we claim is:

1. A motor control device comprising:
   a motor;
   means for instructing a rotation speed of said motor;
   means for detecting the rotation speed of said motor;
   a microcomputer for controlling said motor according to a predetermined program by using an input of said instruction means and an output of said detection means, said microcomputer generating a reference frequency signal in accordance with the input of said instruction means and outputting a phase comparison signal in accordance with the reference frequency signal and the output of said detection means;
   means for generating a predetermined speed control signal according to the input of said instruction means and the output of said detection means; and
   drive means for driving said motor on the basis of said phase comparison signal and said speed control signal, wherein said drive means supplies a motor drive signal to said motor and includes means for adjusting a level of the drive signal, said adjusting means comprising means for manually adjusting the level of the drive signal.

2. A motor control device according to claim 1, wherein said microcomputer controls said adjusting means.

3. A motor control device according to claim 2, wherein said microcomputer controls said adjusting means when said motor has not gained a predetermined number of revolutions.

4. A motor control device comprising:
   a motor;
   means for instructing a rotation speed of said motor;
   means for detecting the rotation speed of said motor;
   microcomputer for controlling said motor according to a predetermined program by using an input of said instruction means and an output of said detection means, said microcomputer generating a reference frequency signal in accordance with the input of said instruction means, generating a predetermined speed control signal in accordance with the input of said instruction means and the output of said detection means, and outputting said reference frequency signal and said speed control signal;
   means for outputting a phase comparison signal according to said reference frequency signal and the output of said detection means; and
   drive means for driving said motor on the basis of said phase comparison signal and said speed control signal, wherein said drive means supplies a motor signal to said motor and includes means for adjusting a level of the drive signal, said adjusting means comprising means for manually adjusting the level of the drive signal.

5. A motor control device according to claim 4, wherein said microcomputer controls said adjusting means.

6. A motor control device according to claim 4, wherein said microcomputer controls said adjusting means when said motor has not gained a predetermined number of revolutions.

7. A motor control device comprising:
   a motor;
   means for instructing a rotation speed of said motor;
   means for detecting the rotation speed of said motor;
   a microcomputer for controlling said motor according to a predetermined program by using an input of said instruction means and an output of said detection means, said microcomputer generating a reference frequency signal in accordance with the input of said instruction means, generating a phase error signal in accordance with the reference signal and the output of said detection means, generating a predetermined speed control signal in accordance with the input of said instruction means and the output of said detection means, and outputting said phase error signal and said speed control signal;
   drive means for outputting a drive signal for driving said motor on the basis of said speed control signal generating by said microcomputer and said phase error signal, wherein said drive means supplies a motor drive signal to said motor and includes means for adjusting a level of the drive signal, said adjusting means comprising means for manually adjusting the level of the drive signal.

8. A motor control device according to claim 7, wherein said drive signal is a pulse width modulation signal formed based on said phase error signal and said speed control signal.

9. A motor control device according to claim 7, wherein said microcomputer controls said adjusting means when said rotation speed of said motor is below a predetermined rotation speed.

10. A motor control device according to claim 7, wherein said drive means comprises adding means for adding said speed control signal and said phase error signal to produce a total signal, means for generating a pulse width modulation signal in accordance with an output of said adding means, and means for outputting said drive signal on the basis of said pulse width modulation signal.

11. A motor control device according to claim 10, wherein said device means further includes means for adjusting each of said speed control signal, said phase error signal and said total signal.

12. A motor control device according to claim 11, wherein said adjusting means is controlled by an output from said microcomputer.

* * * * *

UNITED STATES PATENT AND TRADEMARK OFFICE
CERTIFICATE OF CORRECTION

PATENT NO. : 4,897,778
DATED : January 30, 1990
INVENTOR(S) : Kazuki Miyamoto, et al.

It is certified that error appears in the above-identified patent and that said Letters Patent is hereby corrected as shown below:

ON THE TITLE PAGE:

Related U.S. Application Data:

"Jul. 30, 1989," should read --Jul. 30, 1984,--.

Abstract:

Line 5, "a" should be deleted.

Column 1:

Line 28, "these," should read --these devices,--, and "devices," should be deleted.

Column 5:

Line 8, "Fc" should read --Fs--.

Column 8:

Line 8, "variable resistor." should read --variable resistors.--

Column 10:

Line 52, "in," should read --in--.

Column 15:

Line 20, "board" should read --board 51--.

UNITED STATES PATENT AND TRADEMARK OFFICE
CERTIFICATE OF CORRECTION

PATENT NO. : 4,897,778
DATED : January 30, 1990
INVENTOR(S) : Kazuki Miyamoto, et al.

It is certified that error appears in the above-identified patent and that said Letters Patent is hereby corrected as shown below:

Column 16:

Line 50, "Th en" should read --Then--.

Line 56, "the FS input counter is cleared (38)," should be deleted.

Column 18:

Line 19, "microcomputer" should read --a microcomputer--.

Line 35, "motor" should read -- motor drive--.

Line 65, "generating" should read --generated--.

Column 20:

Line 7, "device means" should read --drive means--.

Signed and Sealed this

Fifteenth Day of December, 1992

Attest:

DOUGLAS B. COMER

*Attesting Officer*      *Acting Commissioner of Patents and Trademarks*